(12) United States Patent
Trifol et al.

(10) Patent No.: US 12,031,401 B2
(45) Date of Patent: Jul. 9, 2024

(54) SYSTEMS AND METHODS FOR CONTROLLING WELL FLUID EQUIPMENT

(71) Applicant: Schlumberger Technology Corporation, Sugar Land, TX (US)

(72) Inventors: Hugues Trifol, Clamart (FR); Laure Mandrou, Bellaire, TX (US); Dominique Bodin, Clamart (FR); Thierry Val, Ligniac (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 114 days.

(21) Appl. No.: 17/905,188

(22) PCT Filed: Mar. 1, 2021

(86) PCT No.: PCT/US2021/020195
§ 371 (c)(1),
(2) Date: Aug. 29, 2022

(87) PCT Pub. No.: WO2021/174179
PCT Pub. Date: Sep. 2, 2021

(65) Prior Publication Data
US 2023/0112716 A1   Apr. 13, 2023

Related U.S. Application Data

(60) Provisional application No. 62/982,766, filed on Feb. 28, 2020.

(51) Int. Cl.
*G05B 13/04* (2006.01)
*E21B 33/035* (2006.01)
(Continued)

(52) U.S. Cl.
CPC .......... *E21B 33/0355* (2013.01); *E21B 43/00* (2013.01); *E21B 47/06* (2013.01);
(Continued)

(58) Field of Classification Search
CPC .. E21B 43/00; E21B 2200/20; E21B 2200/22; G05B 13/041
(Continued)

(56) References Cited

U.S. PATENT DOCUMENTS

| | | | |
|---|---|---|---|
| 2010/0023269 A1* | 1/2010 | Yusti | E21B 43/00 702/12 |
| 2010/0051286 A1 | 3/2010 | McStay et al. | |

(Continued)

FOREIGN PATENT DOCUMENTS

WO   2008116037 A1   9/2008

OTHER PUBLICATIONS

Binkowski, M. et al., "Autoregressive Convolutional Neural Networks for Asynchronous Time Series", Time Series Workshop, Sydney, Australia, 2017, 6 pages.
(Continued)

*Primary Examiner* — Jigneshkumar C Patel
(74) *Attorney, Agent, or Firm* — Jeffrey D. Frantz

(57) ABSTRACT

Methods of controlling surface systems described herein include acquiring data during operation of a surface system that handles fluid using sub-systems; generating a parameter value for one of the sub-systems using at least a portion of the data and a model that models the sub-system using historical data that include operational adjustment data for operational adjustments responsive to conditions; and automatically controlling the one of the sub-systems using the parameter value.

17 Claims, 14 Drawing Sheets

(51) Int. Cl.
*E21B 43/00* (2006.01)
*E21B 47/06* (2012.01)
(52) U.S. Cl.
CPC ........ *G05B 13/041* (2013.01); *E21B 2200/20* (2020.05); *E21B 2200/22* (2020.05)
(58) Field of Classification Search
USPC ........................................................ 700/282
See application file for complete search history.

(56) References Cited

U.S. PATENT DOCUMENTS

| | | | |
|---|---|---|---|
| 2016/0168953 A1 | 6/2016 | Zhang et al. | |
| 2017/0122097 A1* | 5/2017 | Suheil | E21B 43/12 |
| 2017/0234121 A1* | 8/2017 | Anisur Rahman | G01V 20/00 166/250.07 |
| 2020/0157887 A1* | 5/2020 | Alonso | E21B 43/30 |
| 2020/0364623 A1* | 11/2020 | Al-Hajri | G06N 20/10 |
| 2021/0034960 A1* | 2/2021 | Khapali | G06N 3/08 |
| 2021/0325562 A1* | 10/2021 | Salazar David | E21B 41/00 |

OTHER PUBLICATIONS

Search Report and Written Opinion of International Patent Application No. PCT/US2021/020195 dated May 21, 2021, 10 pages.
International Preliminary Report on Patentability of International Patent Application No. PCT/US2021/020195 dated Sep. 9, 2022, 8 pages.
Exam Report Under Section 18(3) issued in United Kingdom Patent Application No. GB2210916.9 dated Aug. 29, 2023, 3 pages.
Substantive Exam issued in Saudi Arabia Patent Application No. 522440243 dated Aug. 6, 2023, 12 pages with English translation.

* cited by examiner

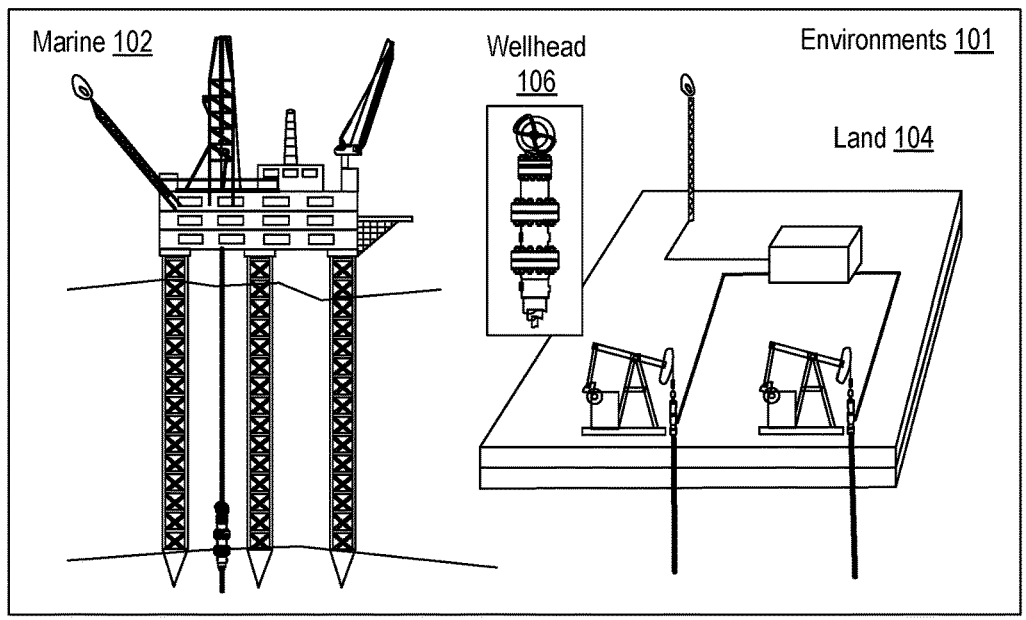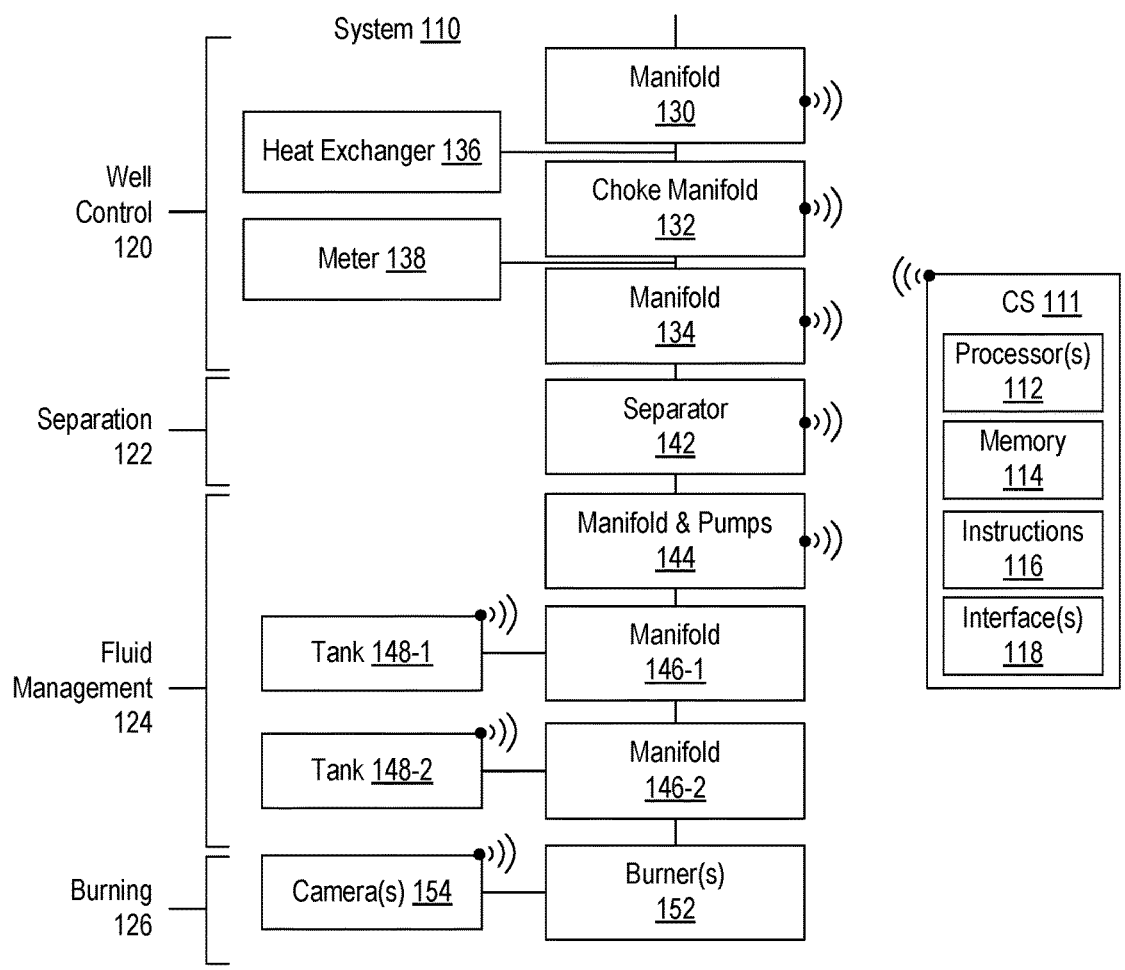
Fig. 1

Controller System 400

| Controller 401 | AC Input 402 | Communication 403 |
|---|---|---|
| AC Output 404 | DC Input 405 | DC Output 406 |
| Other(s) 407 | | |

System 700
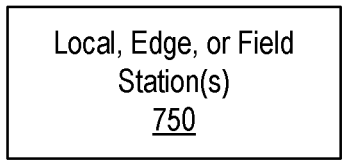
Local, Edge, or Field Station(s) 750
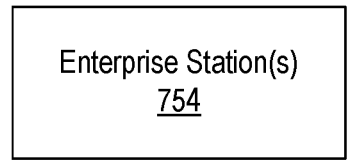
Enterprise Station(s) 754
Supervisory Network 751
- - - - - - - - - - - - - - - - - - - - - - - - - - - - -
Application Server 732
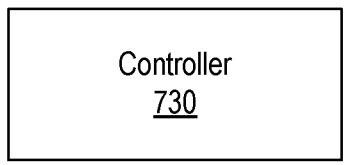
Controller 730
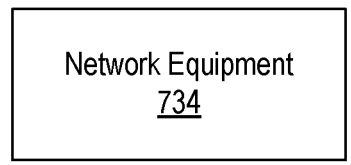
Network Equipment 734
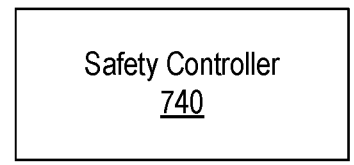
Safety Controller 740
Control Network 731
- - - - - - - - - - - - - - - - - - - - - - - - - - - - -
I/O Network 711
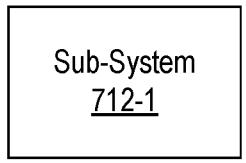
Sub-System 712-1
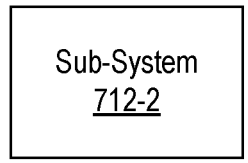
Sub-System 712-2
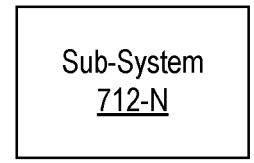
Sub-System 712-N
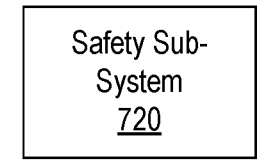
Safety Sub-System 720
Fig. 7

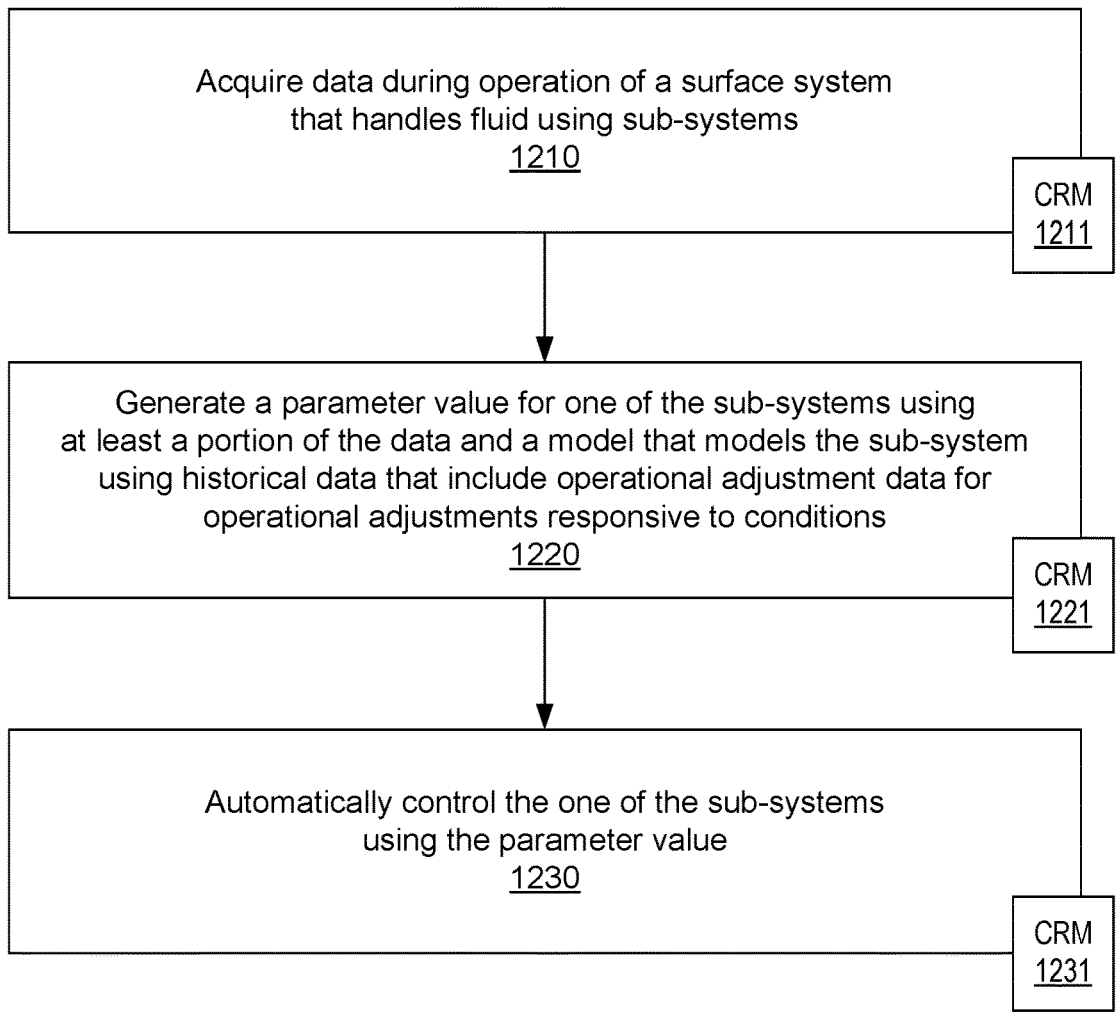
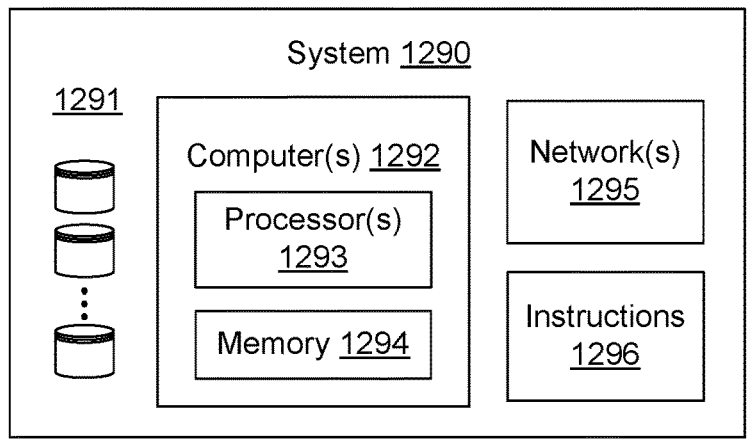
Fig. 12

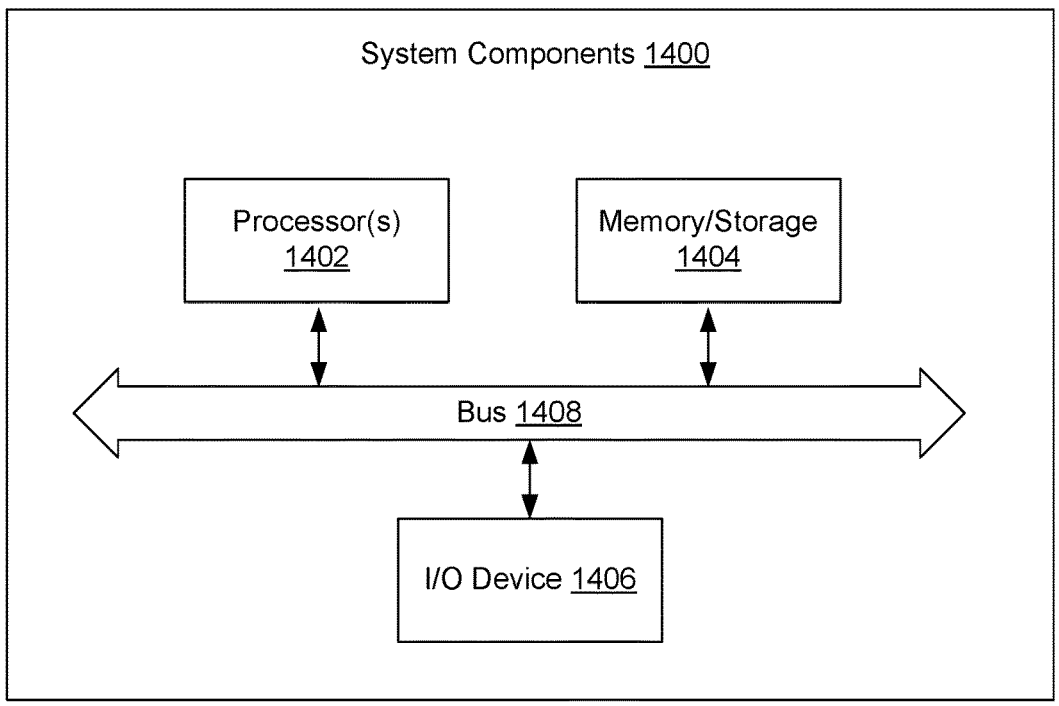
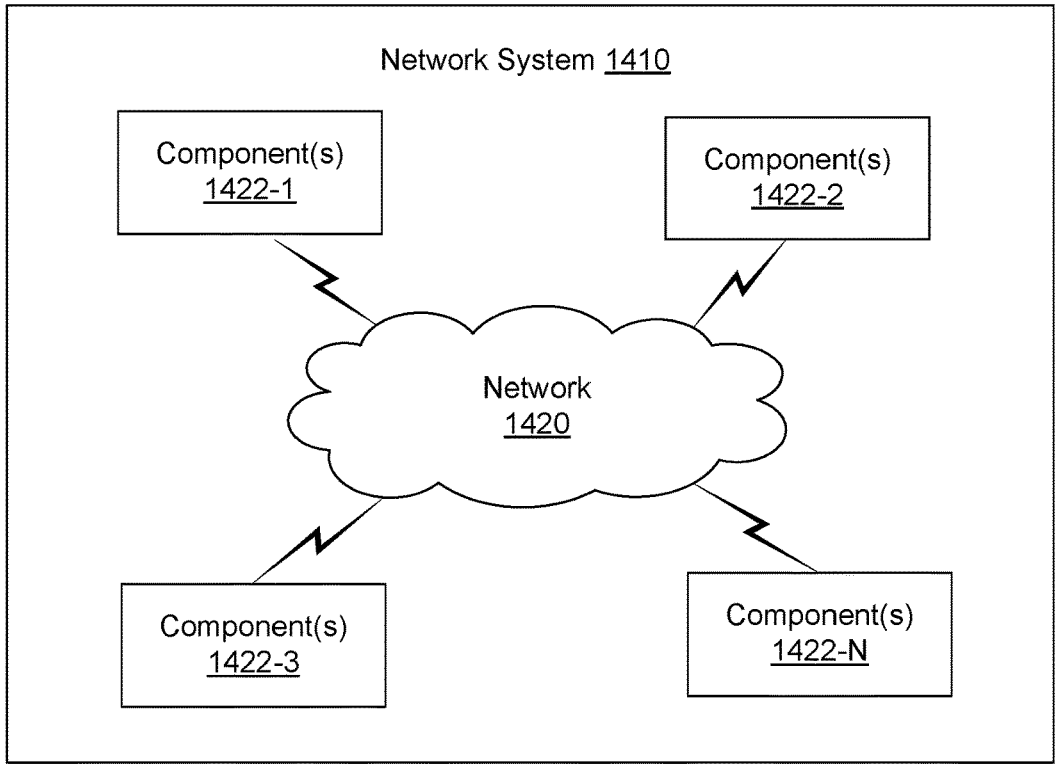
Fig. 14

SYSTEMS AND METHODS FOR CONTROLLING WELL FLUID EQUIPMENT

RELATED APPLICATION

This application is a National Stage Entry of International Patent Application No. PCT/US2021/020195, filed on Mar. 1, 2021, which claims priority to and the benefit of a U.S. Provisional Application having Ser. No. 62/982,766, filed on Feb. 28, 2020, which is incorporated by reference herein.

BACKGROUND

Field

Embodiments described herein generally relate to surface systems for hydrocarbon reservoirs. Specifically, embodiments described herein relate to control of such surface systems.

Description of the Related Art

The global oil and gas industry is trending toward improved environmental safety and compliance throughout the various phases of a well lifecycle. Various phases include use of equipment, which can include equipment that is manually operated by one or more members of a crew where the placement of the equipment and/or the operation of the equipment may present risks.

SUMMARY

Embodiments described herein provide methods for controlling surface systems that can include acquiring data during operation of a surface system that handles fluid using sub-systems; generating a parameter value for one of the sub-systems using at least a portion of the data and a model that models the sub-system using historical data that include operational adjustment data for operational adjustments responsive to conditions; and automatically controlling the one of the sub-systems using the parameter value. Various other examples of methods, systems, computer-program products, etc., are also described herein.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 1 is a series of diagrams of example environments and an example of a surface system.

FIG. 7 is a diagram of an example of a system.
FIG. 12 is a diagram of an example of a method and an example of a system.
FIG. 14 is a diagram of example components of a system and a networked system.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 2:
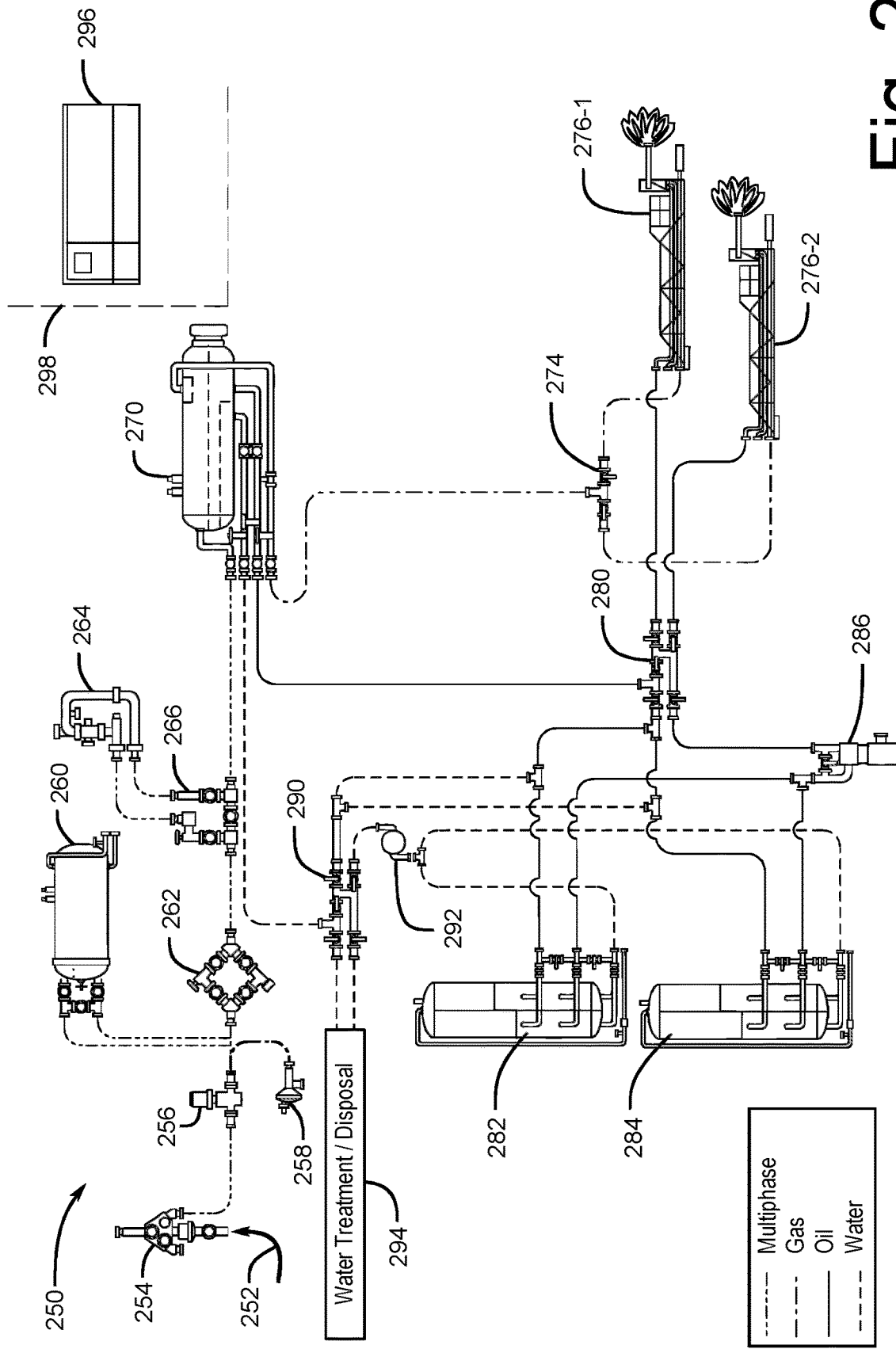
FIG. 2 is a diagram of an example of a surface system.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

FIG. 1 shows examples of environments 101, including a marine environment 102 and a land environment 104 where the marine environment 102 includes various equipment and where the land environment 104 includes various equipment. As shown, each of the environments 101 can include one or more wellheads 106 (e.g., wellhead equipment). A wellhead can be a surface termination of a wellbore that can include a system of spools, valves and assorted adapters that, for example, can provide for pressure control of a production well. A wellhead may be at a land surface, a subsea surface (e.g., an ocean bottom, etc.), etc. As an example, a wellhead can include one or more valves such as, for example, one or more choke valves. A choke valve may be located on or near a Christmas tree that is used to control the production of fluid from a well. For example, opening or closing a variable valve can influence the rate and pressure at which production fluids progress through a pipeline, process facilities, etc. As an example, an adjustable choke may be operatively coupled to an automated control system to enable one or more production parameters of one or more individual wells to be controlled. As an example, conduits from multiple wellheads may be joined at one or more manifolds such that fluid from multiple wells can flow in a common conduit.

As shown, in various environments, during one or more phases of development, production, etc., surface equipment can be present that is in fluid communication with a borehole, a completed well, etc. Such surface equipment (e.g., a surface system) can be in fluid communication for purposes of fluid injection and/or fluid production. For example, fluid injection can include injection of hydraulic fracturing fluid to generate fractures in a reservoir to increase production of hydrocarbon containing fluids from the reservoir, injection of treatment fluid such as a fluid for stimulation purposes, etc. As to fluid production, surface equipment can include various types of conduits, valves, meters, separators, etc. As an example, a surface system can include equipment that can be standalone in its operation and/or control. For example, a sub-system may be skid-mounted with a controller unit provided. In such an example, an overarching controller system may be operatively coupled to the controller unit. Where a surface system includes various sub-systems, each may include its own controller unit and/or interface that can be operatively coupled to an overarching controller system.

In various instances, however, an overarching controller system approach can make supervisory control decisions that may impact a sub-system where the sub-system may be left on its own as to how it handles or responds to a supervisory control decision. For example, consider an approach that aims to adequately control one or more set points (e.g., pressure, level, etc.) and that may take higher level actions as appropriate such as regulating flowrate to remain in a pressure/flowrate range of equipment.

In various examples, an autonomous surface system is described with respect to surface equipment associated with well testing, noting that, as mentioned, one or more other types of surface system may be similarly instrumented to be an autonomous surface system for one or more purposes.

Referring again to FIG. 1, at various times, a well may be tested using a process referred to as well testing. Well testing can include one or more of a variety of well testing operations. In various instances, fluid can flow from a well or wells to surface where the fluid is subjected to one or more well testing operations and generates scrap (e.g., waste fluid), which is to be handled appropriately, for example, according to circumstances, regulations, etc. For example, consider loading waste fluid into a tanker for transport to a facility that can dispose of the waste fluid. Another manner of handling waste fluid can be through combustion, which can be referred to as burning. As an example, burning can be part of a well testing process, whether burning is for handling waste fluid and/or for analyzing one or more aspects of how one or more waste fluids burn. As to the latter, burning may optionally provide data as to one or more characteristics of well fluid (e.g., a component thereof, etc.).

As an example, well testing can be performed during one or more phases such as during exploration and appraisal where production of hydrocarbons are tested using a temporary production facility that can provide for fluid sampling, flow rate analysis and pressure information generation, for example, to help characterize a reservoir. Various decisions can be based on well testing such as, for example, decisions as to production methods, facilities and possible well productivity improvements.

As to the example environments 101 of FIG. 1, well testing may be performed, for example, using equipment shown in the marine environment 102 and/or using equipment shown in the land environment 104. As an example, an environment may be under exploration, development, appraisal, etc., where such an environment includes at least one well where well fluid can be produced (e.g., via natural pressure, via fracturing, via artificial lift, via pumping, via flooding, etc.). In such an environment, various types of equipment may be on-site, which may be operatively coupled to well testing equipment.

FIG. 1 shows an example of a system 110 (e.g., a surface system) that can be operatively coupled to one or more conduits that can transport well fluid, for example, from one or more wellheads. As shown the system 110 can include a computational system 111 (CS), which can include one or more processors 112, memory 114 accessible to at least one of the one or more processors 112, instructions 116 that can be stored in the memory 114 and executable by at least one of the one or more processors 112, and one or more interfaces 118 (e.g., wired, wireless, etc.), which may be utilized, for example, for one or more types of communications with one or more of the different sub-systems and/or pieces of equipment of the surface system. In the example of FIG. 1, the system 110 is shown as including various communication symbols, which may be for transmission and/or reception of information (e.g., data, commands, etc.), for example, to and/or from the computational system 111. As an example, the computational system 111 can be a controller that can issue control instructions to one or more pieces of equipment in an environment such as, for example, the marine environment 102 and/or the land environment 104. As an example, the computational system 111 may be local, may be remote or may be distributed (e.g., in part local and in part remote, multiple local and/or remote locations, etc.).

Referring again to the wellhead 106, it can include various types of wellhead equipment such as, for example, casing and tubing heads, a production tree, a blowout preventer, etc. Fluid produced from a well can be routed through the wellhead 106 and into the system 110, which can be configured with various features for well testing operations.

In the example of FIG. 1, the system 110 is shown to include various segments, which may be categorized operationally. For example, consider a well control segment 120, a separation segment 122, a fluid management segment 124, and a burning segment 126. In such an example, one or more of the various segments may correspond to a sub-system or sub-systems. For example, consider the separation segment 122 corresponding to a separation sub-system.

As shown in the example of FIG. 1, the well control segment 120 is an assembly of various components such as a manifold 130, a choke manifold 132, a manifold 134, a heat exchanger 136 and a meter 138; the separation segment 122 includes a separator 142; the fluid management segment 124 is an assembly of various components such as pump manifolds and pumps 144, a tank manifold 146-1, a tank manifold 146-2, a tank 148-1 and a tank 148-2; and the burning segment 126 includes a burner 152 and one or more cameras 154. In various examples, a manifold can be an arrangement of pipes and valves for the control of fluid circulation. A tank manifold can enable control of fluid in and/or out of a tank while a pump manifold can enable control of fluid in and/or out of pumps.

As mentioned, in the example of FIG. 1, the system 110 includes various features for one or more aspects of well testing operations; noting that the system 110 may include lesser features, more features, alternative features, etc. In particular, each segment may include one or more sensors associated with one or more pieces of equipment and/or locations in the segment. The sensors may sense parameters (e.g., variables, etc.) such as temperature, pressure, flow or state of an equipment (for instance state of a valve). One or more other types of sensors may also be used as part of the system. For example, consider one or more of a gas specific gravity meter, a water-cut meter, a gas-to-oil ratio sensor, a carbon dioxide sensor, a hydrogen sulfide sensor, or a shrinkage measurement device. Various features may be upstream and/or downstream of a separator segment or a separator.

With respect to flow of fluid from a well or wells, such fluid may be received by the well control segment 120 and then routed via one or more conduits to the separation segment 122. In the example of FIG. 1, the heat exchanger 136 may be provided as a steam-heat exchanger and the meter 138 for measuring flow of fluid through the well control segment 120.

As mentioned, the well control segment 120 can convey fluid received from one or more wells to the separator 142. As an example, the separator 142 can be a horizontal separator or a vertical separator, and can be a two-phase separator (e.g., for separating gas and liquids) or a three-phase separator (e.g., for separating gas, oil, and water). A separator may include various features for facilitating separation of components of incoming fluid (e.g., diffusers, mist extractors, vanes, baffles, precipitators, etc.).

As an example, fluid can be single phase or multiphase fluid where "phase" can refer to an immiscible component (e.g., consider two or more of oil, water and gas for a multiphase fluid).

As an example, the separator 142 can be used to substantially separate multiphase fluid into its oil, gas, and water phases, as appropriate and as present, where each phase emerging from the separator 142 may be referred to as a separated fluid. Such separated fluids may be routed away from the separator 142 to the fluid management segment 124. In various instances, the separated fluids may not be entirely homogenous. For example, separated gas exiting the separator 142 can include some residual amount of water or oil and separated water exiting the separator 142 can include some amount of oil or entrained gas. Similarly, separated oil leaving the separator 142 can include some amount of water or entrained gas.

As shown in the example of FIG. 1, a system can include one or more manifolds, where depending on number of wells (e.g., 1, 2, 3, . . . , N), types of equipment, etc., a single manifold may suffice or there may be more than a single manifold. In the example of FIG. 1, the fluid management segment 124 can include flow control equipment, such as one or more manifolds and one or more pumps (generally represented by the block 144) for receiving fluids from the separator 142 and conveying the fluids to other destinations, optionally along with one or more additional manifolds 146-1 and 146-2, for example, for routing fluid to and from fluid tanks 148-1 and 148-2. As explained, the number of manifolds and tanks can be varied according to various factors. For instance, in one embodiment the fluid management segment 124 can include a single manifold and a single tank, while in other embodiments the fluid management segment 124 can include more than two manifolds and more than two tanks.

As to the manifolds and pumps 144, they can include a variety of manifolds and pumps, such as a gas manifold, an oil manifold, an oil transfer pump, a water manifold, and a water transfer pump. In at least some embodiments, the manifolds and pumps 144 can be used to route fluids received from the separator 142 to one or more of the fluid tanks 148-1 and 148-2 via one or more of the additional manifolds 146-1 and 146-2, and to route fluids between the tanks 148-1 and 148-2. As an example, the manifolds and pumps 144 can include features for routing fluids received from the separator 142 directly to the one or more burners 152 for burning gas and oil (e.g., bypassing the tanks 148-1 and 148-2) or for routing fluids from one or more of the tanks 148-1 and 148-2 to the one or more burners 152.

As noted above, components of the system 110 may vary between different applications. As an example, equipment within each functional group of the system 110 may also vary. For example, the heat exchanger 136 could be provided as part of the separation segment 122, rather than of the well control segment 120.

In certain embodiments, the system 110 can be a surface well testing system that can be monitored and controlled remotely. Remote monitoring may be effectuated with sensors installed on various components. In some instances, a monitoring system (e.g., sensors, communication systems, and human-machine interfaces) can enable monitoring of one or more of the segments 120, 122, 124 and 126. As shown in the example of FIG. 1, the one or more cameras 154 can be used to monitor one or more burning operations of the one or more burners 152, which may aim to facilitate control of such one or more burning operations at least in part through analysis of image data acquired by at least one of the one or more cameras 154. As an example, one or more cameras may be utilized for temperature monitoring. For example, consider an infrared camera that can utilize infrared wavelength emissions (e.g., consider approximately 1 µm to approximately 14 µm) to determine temperature where temperature may be utilized for process control, safety, etc.

FIG. 2 shows an example of a system 250, which may be referred to as a surface well testing system. The system 250 can include various features of the system 110 of FIG. 1.

In FIG. 2, a multiphase fluid (represented here by arrow 252) enters a flowhead 254 and is routed to a separator 270 through a surface safety valve 256, a steam-heat exchanger 260, a choke manifold 262, a flow meter 264, and an additional manifold 266. In the example of FIG. 2, the system 250 includes a chemical injection pump 258 for injecting chemicals into the multiphase fluid flowing toward the separator 270, as may be desired.

In the depicted embodiment of FIG. 2, the separator 270 is a three-phase separator that generally separates the multiphase fluid 252 into gas, oil, and water components. The separated gas is routed downstream from the separator 270 through a gas manifold 274 to either of the burners 276-1 and 276-2 for flaring gas and burning oil. The gas manifold 274 includes valves that can be actuated to control flow of gas from the gas manifold 274 to one or the other of the burners 276-1 and 276-2. Although shown next to one another in FIG. 2 for sake of clarity, the burners 276-1 and 276-2 may be positioned apart from one another, such as on opposite sides of a rig, etc.

As shown, the separated oil from the separator 270 can be routed downstream to an oil manifold 280. Valves of the oil manifold 280 can be operated to permit flow of the oil to either of the burners 276-1 and 276-2 or either of the tanks 282 and 284. The tanks 282 and 284 can be of a suitable form, but are depicted in FIG. 2 as vertical surge tanks each having two fluid compartments. Such an approach allows each of the tanks 282 and 284 to simultaneously hold different fluids, such as water in one compartment and oil in the other compartment. An oil transfer pump 286 may be operated to pump oil through the well testing system 250 downstream of the separator 270. The separated water from the separator 270 can be similarly routed to a water manifold 290. Like the oil manifold 280, the water manifold 290 includes valves that can be opened or closed to permit water to flow to either of the tanks 282 and 284 or to a water treatment and disposal apparatus 294. A water transfer pump 292 may be used to pump the water through the system.

A well test area in which the well testing system 250 (or other embodiments of a well testing system) is installed may be classified as a hazardous area. In some embodiments, the well test area is classified as a Zone 1 hazardous area according to International Electrotechnical Commission (IEC) standard 60079-10-1:2015.

In the example of FIG. 2, a cabin 296 at a wellsite may include various types of equipment to acquire data from the well testing system 250. These acquired data may be used to monitor and control the well testing system 250. In at least some instances, the cabin 296 can be set apart from the well test area having the well testing system 250 in a non-hazardous area. This is represented by the dashed line 298 in FIG. 2, which generally serves as a demarcation between the hazardous area having the well testing system 250 and the non-hazardous area of the cabin 296.

The equipment of a well testing system can be monitored during a well testing process to verify proper operation and facilitate control of the process. Such monitoring can include taking numerous measurements by appropriate sensors during a well test, examples of which can include choke manifold temperature and pressures (upstream and downstream), heat exchanger temperature and pressure, separator temperature and pressures (static and differential), oil flow rate and volume from the separator, water flow rate and volume from the separator, and fluid levels in tanks of a system.

As an example, a system can be configured for local and/or remote rendering of information, control, etc. For example, consider a mobile computing device such as a tablet computing device that can be operatively coupled to remote computing resources via a wired network, a wireless network, etc. In such an example, the remote computing resources may be or include a multicloud management platform (MCMP, e.g., an IBM MCMP, etc.; International Business Machines Corporation, Armonk, New York). In such an example, a mobile computing device can include hardware suitable to execute a browser application or another type of application suitable for rendering graphical user interfaces to a display, which may be a touchscreen display. For example, consider a browser application executing on a mobile computing device that a user can interact with a MCMP for one or more purposes. In such an approach, the mobile computing device may provide for interactions for one or more of equipment maintenance, equipment sensor data, equipment control (e.g., set points, etc.), etc. In such an approach, a user may assess equipment using the mobile computing device, which can provide the user flexibility as to the user's location, which may be, for example, remote from an equipment site. Using the mobile computing device, a user may "check" various types of equipment that are at a site on a daily basis or a less frequent basis and/or a more frequent basis.

Figure 3:
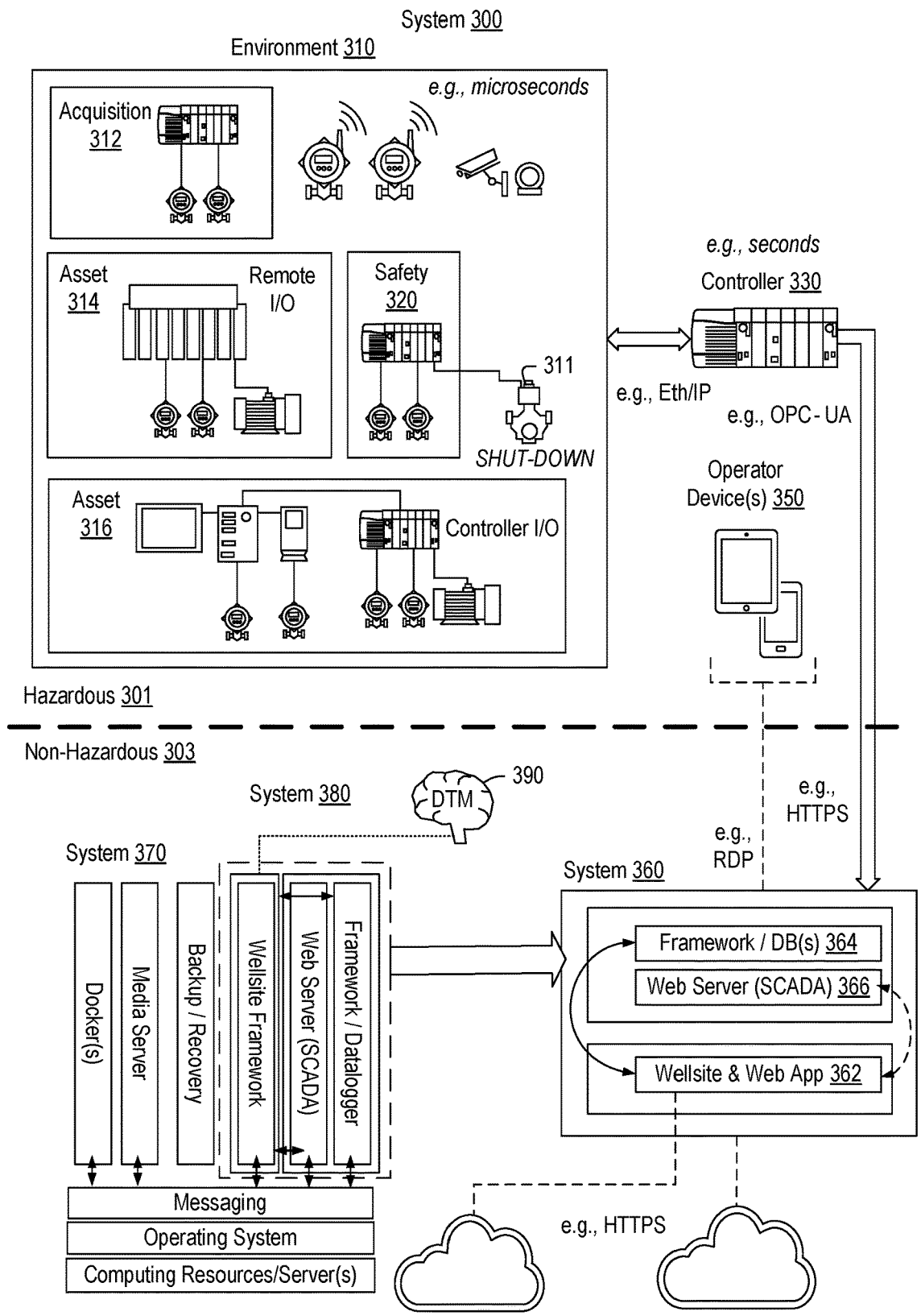
FIG. 3 is a diagram of an example of a system.

FIG. 3 shows an example of a system 300 that includes a hazardous area 301 and a non-hazardous area 303; noting that various types of computing equipment, network equipment, etc., can be positioned or re-positioned into one or more of the areas 301 and 303. As mentioned, a cabin can be included in an area, which may help to protect one or more people, equipment, etc., from one or more hazards, or, for example, a cabin may be in an area characterized as being non-hazardous.

In the example of FIG. 3, the system 300 is illustrated as an architecture with various type of equipment. For example, an environment 310 is shown as including equipment that can perform various actions with respect to well operations such as, for example, well testing.

Where such a system does not include various features of the system 300, one or more operators may be present for one or more manual tasks as to operations in the environment 310. Such tasks can be referred to as jobs, which may be designated using the French word "métier", which can mean job, for example, the job of testing a well. In performing such tasks (e.g., jobs), an operator can have knowledge and expertise as to how equipment behaves under certain conditions, how fluid behaves under certain conditions, how combustion behaves under certain conditions, etc. Such an operator may be instructed to or understand how to take one or more actions in the environment 310, which may be for optimization of one or more processes and/or for reduction of risk, for example, in an emergency situation. As a system can include numerous sub-systems, coordinate action may be demanded to properly optimize and/or to reduce risk. However, where coordinated action is via a crew, there can be considerable demands placed on members of the crew, particularly with respect to timing, adjustments, communications, etc. For example, an action taken by a first operator at a first sub-system may impact how fluid flows to a second sub-system, which may be managed by a second operator. If the second operator does not expect the impact, the second operator may view changes as being an emergency and call for a system-wide shut down or the second operator may make one or more changes that cascade to one or more other sub-systems.

In a system, overarching control, which may be referred to as supervisory control, and sub-system control may be implemented, optionally with one or more independent safety systems. In such an example, one or more digital twins with métier (DTM) can be implemented, which can operate at least in part on a sub-system level. The DTM is a model replicating virtually one or more pieces of equipment at a well site. Such a DTM may be used to run simulations and be trained to determine an optimal behavior of the equipment and/or the system 300 based on the current sensed parameters. For example, consider a DTM of a separator that has been trained (e.g., via machine learning, etc.) to possess knowledge and expertise of an operator that is skilled in the operation of the separator. In such an example, the DTM may be localized and operate in a manner that is knowledge, expertise and data-based. For example, sensor data can be acquired for the separator and input to a model that can output one or more parameter values that can be utilized to control the operation of the separator. In such an example, the separator can be controlled as an autonomous surface system (e.g., an autonomous surface subsystem). Such a DTM approach can be robust and capable of handling events such as, for example, shut down at a wellhead, optionally without receipt of a communication of that event. For example, the DTM may be robust in that it can respond to locally acquired data and understand what parameter values will result in optimal operation of the separator, whether for purposes of well testing or other operation(s) (e.g., shut down, startup, etc.).

In the example of FIG. 3, the environment 310 includes flow control equipment 311 (e.g., capable of performing a shut down and/or other process action), which can be in fluid communication with one or more wells, for example, to provide well fluid to one or more pieces of equipment in the environment 310. As shown, the environment 310 can include various data acquisition equipment 312, one or more assets 314 and 316 (e.g., sub-systems, etc.), and a safety system 320 operatively coupled to the flow control equipment 311. As an example, where a condition arises, or conditions arise, that warrant action as to safety, the safety system may issue a control instruction to shut-down fluid flow using the flow control equipment 311 (e.g., a choke valve, etc.).

In the example of FIG. 3, the environment 310 can include one or more types of controllers, which may be operatively coupled to various equipment. Such controllers (e.g., controller units, controller systems, etc.) can be manufactured and/or otherwise protected for purposes of operating in the environment 310.

As shown, the system 300 can include a controller 330, which can be a controller system that is operatively coupled to equipment in the environment 310 via one or more communication technologies. For example, consider wire and/or wireless technologies, which may utilize one or more types of communication protocols. For example, consider EtherNet/IP where "IP" is an abbreviation of "Industrial Protocol", which is an industrial network protocol that adapts the Common Industrial Protocol (CIP) to Ethernet. As an example, the controller 330 may be a supervisory level controller.

As an example, in the system 300, an operator may be present in the environment 310 or in a vicinity of the environment 310 and utilize one or more computing devices 350, which may be operatively coupled to equipment in the hazardous area 301 and/or the non-hazardous area 303 (e.g., directly, indirectly, etc.) via one or more interfaces. For example, consider a mobile device that can communicate with the controller 330 and/or the safety system 320, which may be via direct and/or indirect communication (e.g., wired and/or wireless).

FIG. 3 also shows various communications that may utilize one or more technologies such as, for example, one or more of HTTPS, Remote Desktop Protocol (RDP), an OPC Unified Architecture (OPC-UA), etc.

The Hypertext Transfer Protocol Secure (HTTPS) is an extension of the Hypertext Transfer Protocol (HTTP) and can be used for secure communication over a computer network. In HTTPS, the communication protocol can be encrypted using a security technology such as Transport Layer Security (TLS) or Secure Sockets Layer (SSL).

The Remote Desktop Protocol (RDP) is a proprietary protocol developed by Microsoft Corporation (Redmond, Washington) that can provide for rendering a graphical interface to connect to another computer over a network connection. The RDP involves use of RDP client software and RDP server software (e.g., also consider HTTPS, etc.). Clients exist for various operating systems (OSs) (e.g., WINDOWS, LINUX, UNIX, macOS, iOS, ANDROID, etc.). RDP servers can be built into an OS (e.g., WINDOWS OS, UNIX OS, etc.), where a server can listen on a TCP port and a UDP port. The RDP is an extension of the ITU-T T.128 application sharing protocol.

OPC-UA is a machine to machine communication protocol for industrial automation developed by the OPC Foundation. It can provide for communications between industrial equipment and systems for data collection and control, be cross-platform, provide a service-oriented architecture (SOA), and provide for various security measures.

OPC-UA can utilize an integral information model for modeling data into an OPC-UA namespace for the SOA. OPC-UA supports protocols such as a binary protocol (e.g., opc.tcp://server) and an HTTP protocol (e.g., http://server) for web service. OPC-UA can operate transparent to an application programming interface (API). As an example, EtherNet/IP may be utilized, optionally according to one or more API specifications.

A binary protocol can offer lesser overhead and demand fewer resources (e.g., no XML Parser, SOAP and HTTP), which can facilitate operations for embedded devices. A binary protocol can offer interoperability and use a single arbitrarily choosable TCP port for communication easing tunneling or easy enablement through a firewall.

As an example, the web service (SOAP) protocol may be utilized and be supported from available tools (e.g., JAVA or .NET environments) and can be firewall-friendly (e.g., using HTTP(S) ports).

In the example of FIG. 3, the non-hazardous area 303 is shown as including various systems 360, 370 and 380 along with a digital twin métier (DTM) 390 (e.g., or a plurality of DTMs, etc.). The DTM 390 can be built using one or more systems and then deployed for use locally with respect to wellsite equipment in the environment 310. For example, the DTM 390 can be a model, which may be, for example, an algorithm (e.g., handcoded decision tree, etc.) or a trained machine learning model (trained ML model) that can be deployed to one or more controllers, which may be in the hazardous area 301 and/or optionally in a cabin, etc., which may be a "safe" area within the hazardous area 301 or in an area adjacent to the hazardous area 301.

As an example, the DTM 390 can be deployed to the controller 330, which, as mentioned, can be a primary controller for the environment 310 (e.g., a supervisory level controller). As explained, for reasons of safety, the safety system 320 may operate where one or more conditions arise that can elevate risk. For example, the safety system 320 may respond to the controller 330 going down (e.g., loss of power, operational error, etc.) and/or may respond to the controller being unable to sufficiently control a condition or conditions, which can include one or more types of trending conditions of the environment 310. As to operations, the safety system 320 may cause cessation of fluid flow via the flow control equipment 311 (e.g., a choke valve, etc.).

As mentioned, the DTM 390 may be representative of a sub-system within the environment 310 where it may provide for an autonomous surface sub-system. As mentioned, a separator can be modeled as a digital twin where operator knowledge and expertise as embodied in tasks, jobs, etc., to be performed by the operator are also modeled such that the digital twin is a digital twin with métier (DTM). As mentioned, the environment 310 can include various sub-systems and one or more DTMs may be each representative of one or more of the sub-systems.

As to various components, systems, etc., in the non-hazardous area 303, as shown in FIG. 3, the system 360 can include a component 362 for a wellsite framework and one or more web applications, which can be operatively coupled to a component 364 for a data framework that can include or be operatively coupled to one or more databases (DBs). As shown, the system 360 can include a component 366 for a web server that may operate according to a supervisory control and data acquisition (SCADA) architecture, which can provide for interactions between computing devices, controllers, networked data communications equipment, graphical user interfaces (GUIs), etc. A SCADA architecture can provide for high-level process supervisory management, while also including other peripheral devices like programmable logic controllers (PLC) and discrete proportional-integral-derivative (PID) controllers to interface with equipment.

In the example of FIG. 3, the system 360 can be in communication with the controller 330 (e.g., OPC-UA, etc.) and via one or more of the operator devices 350 (e.g., RDP, HTTPS, etc.). The system 360 can utilize one or more virtualization technologies such as, for example, virtual machines (VM) and/or containerization. As an example, a system may include hardware virtual machines and/or process virtual machines.

As an example, a VM may run a complete operating system, including its own kernel. As an example, a container can be an isolated, lightweight silo for running an application on a host operating system (host OS). As an example, a container may build on top of a host OS's kernel and include apps and, for example, some lightweight OS APIs and services that may run in a user mode.

The system 360 can be implemented using various resources, which can include cloud-based resources. As an example, the system 360 may be in part implemented using cloud-based resources (e.g., servers of a server farm, data storage devices of a server farm, etc.). As an example, the system 360 can be accessible via one or more protocols (e.g., via wire or wirelessly) such that remote interactions can occur (e.g., for remote management, etc.), which may be via a cloud environment.

As to the component 364, it can include various features of the Rockwell Automation suite (e.g., FactoryTalk suite, etc., Rockwell Automation, Milwaukee, Wisconsin). Such features may be suitable for interactions with a controller system, a controller unit, etc., which may be a Rockwell Automation controller system, controller unit, etc. (e.g., consider one or more Allen-Bradley products, etc.).

As an example, the component 364 can provide for organizing data at equipment and/or enterprise levels. The component 364 can include historian features for collecting time-series data for various calculations, estimations, and statistical processes. The component 364 may provide for reporting and trending reports.

As an example, the component 364 can provide for predictions such as, for example, anomaly predictions, equipment degradation predictions, etc. As an example, the component 364 can include an embedded analytics feature, which can provide analytics for use in training a machine learning model, operating a trained machine learning model, etc.

In the example of FIG. 3, the system 370 can include various features for media, applications and dockers, which may be operatively coupled to a component labeled as message bus/message queue, which can be a message broker resource (e.g., message-oriented middleware) that can implement the Advanced Message Queuing Protocol (AMQP) and be extended with a plug-in architecture to support Streaming Text Oriented Messaging Protocol (STOMP), MQTT, and other protocols. Such a component can be operable using a LINUX operating system environment, which may be implemented using a component such as a multicloud management platform (MCMP, International Business Machines Corporation, Armonk, New York), which can utilize one or more servers. The MCMP can be operable using one or more cloud environments and be browser accessible via one or more browser applications.

In the example of FIG. 3, the system 380 can include various features of the system 360 such as, for example, a data framework, a datalogger (e.g., a historian, etc.), a web server (e.g., SCADA, etc.), and a wellsite framework. As an example, the system 380 can be a cloud-based system that can provide for building one or more DTMs 390, which can then be deployed to a particular wellsite or wellsites. As an example, a particular wellsite can include an instance of the system 380 appropriately scaled for the particular wellsite. As an example, the system 380 can include features for selecting the DTM 390, building the DTM 390, tailoring the DTM 390, deploying the DTM 390, operating the DTM 390, etc.

In the example of FIG. 3, as explained, the DTM 390 can be utilized for controlling one or more pieces of equipment in the environment 310. As mentioned, the DTM 390 may be a relatively light-weight object that can be implemented using an operating system of one or more pieces of equipment, a controller unit, a controller system, etc. As explained, the environment 310 can include the safety system 320 for purposes of assuring that safety guidelines are implemented where, for example, an issue may arise whereby control via the DTM 390 and/or one or more other control mechanisms may be inadequate. As explained, a sub-system in the environment 310 can include a specialized DTM that can be robust and provide for autonomous operation of the sub-system where an event may occur such as a shut down by the safety system 320. In such an example, safety within the environment 310 can be enhanced as a sub-system DTM may provide for control of the sub-system in a manner that reduces risk to the sub-system, to one or more operators (e.g., if present or later present), to the environment (e.g., spillage, flaming, etc.), etc.

As an example, the system 300 can include logic, for example, at a PLC level, that can be sufficient to manage a safe shut down. For example, consider a scenario where a network connection is lost or otherwise compromised. In such an example, DTM control may be confounded such that logic at a PLC level can address such a scenario, particularly where an emergency shutdown (ESD) system operates to shut off flow from a well. In such an example, consider a separator as a sub-system that had been in fluid communication with the well where the separator can itself be controlled appropriately, for example, to have a controlled shutdown that aims to reduce one or more risks such as a spill risk, an overpressure risk, etc.

Figure 4:
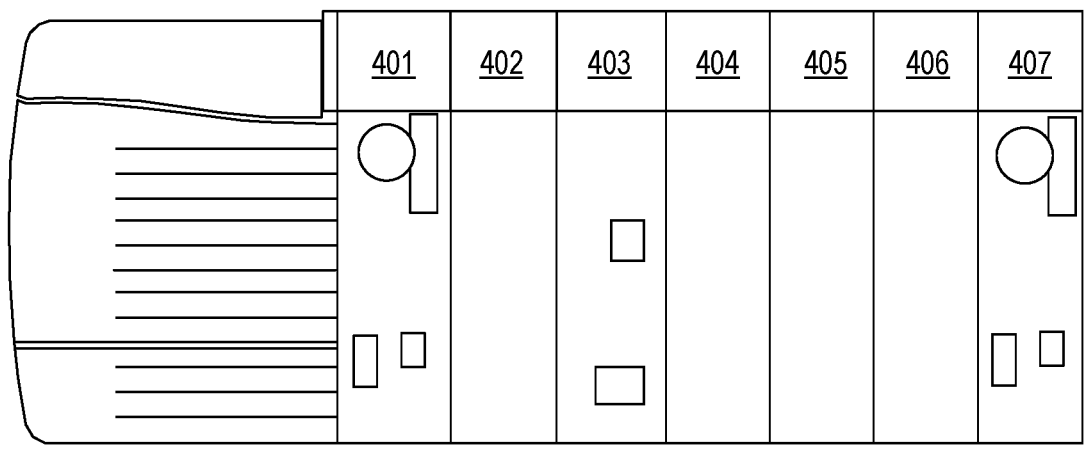
FIG. 4 is a diagram of an example of a controller system.

FIG. 4 shows an example of a controller system 400 that includes various units. As an example, the controller system 400 can include various units that can be assembled in a manner where the units can be operatively coupled for one or more purposes. As shown in FIG. 4, the controller system 400 includes a controller unit 401, an AC input unit 402, a communication unit 403, an AC output unit 404, a DC input unit 405, a DC output unit 406, and one or more other units 407.

As an example, a DC input unit may allow for connection of PNP (sourcing) and/or NPN (sinking) transistor type devices (e.g., a sensor, a switch, etc.). As an example, an AC input unit can handle non-polarized AC voltage where, for example, the AC voltage is being switched through a limit switch or other switch type. AC input units tend to be less common than DC input units as various sensors can have transistor output(s). For example, a sensor may be operating on a DC voltage and provide a DC output that can be received via a DC input unit.

The controller system 400 may be suitable for use as the controller 330 of the system 300 of FIG. 3 and/or for use as a sub-system controller (see, e.g., assets 314, 316, etc.).

As an example, the controller system 400 can include one or more types of circuitry, features, etc., of a controller system (e.g., compact logic, PLC, etc.). As an example, a controller system can include a controller unit, a communication unit, a power supply unit, one or more discrete input units, one or more removable terminal blocks for a discrete input unit, a discrete output unit, one or more removable terminal blocks for a discrete output unit, an analog input unit, executable instructions stored in memory, one or more redundant units (e.g., for redundant control, redundant power, redundant communication, etc.), etc.

As an example, a controller unit, a controller system, etc., can be or include one or more programmable logic controller (PLC) units. As an example, a controller system may be configured with particular units for dedicated use, for example, as a safety controller that can call for one or more types of actions relating to safety. Such a controller may be independent of one or more other controllers such that, where a primary controller fails, the safety controller can be independent and take appropriate action. As to a failure of a primary controller, such a failure can be for one or more reasons, which can include, for example, failure of the controller itself or failure of the controller to adequately control one or more processes.

As an example, the controller system 400 can include one or more DTMs such as, for example, the DTM 390 of FIG. 3. In such an example, the DTM can be an algorithm that is handcoded, etc. (e.g., a decision tree model with predefined criteria, etc.) or be a trained machine learning model (e.g., a decision tree model, one or more neural networks, etc.). As an example, a DTM may evolve from being a relatively basic structure to being a more complex structure that can model more "métier" as it evolves. As an example, a DTM may learn using data such that it evolves to possess an ability to handle scenarios beyond those of a certain level of skilled operator. For example, using learning, a DTM may make inferences beyond those of a skilled operator such that the DTM can output parameter values for optimal operational conditions that are not readily achieved (e.g., in limited amount of time, etc.) by a skilled operator. As mentioned, a DTM may provide for robust autonomous control responsive to one or more other actions taken with respect to one or more other sub-systems, which can include, for example, a shut down event where flow at a wellhead is shut down (e.g., reduced to approximately zero).

As explained, a DTM can be based on data and can operate responsive to data being input such that the DTM can generate output. As to various types of data, data can include fluid data as acquired by a flow meter as flow, amount of flow, characteristics of flow, characteristics of fluid, etc., can be indicators as to how a system or a sub-system is behaving.

Figure 5:
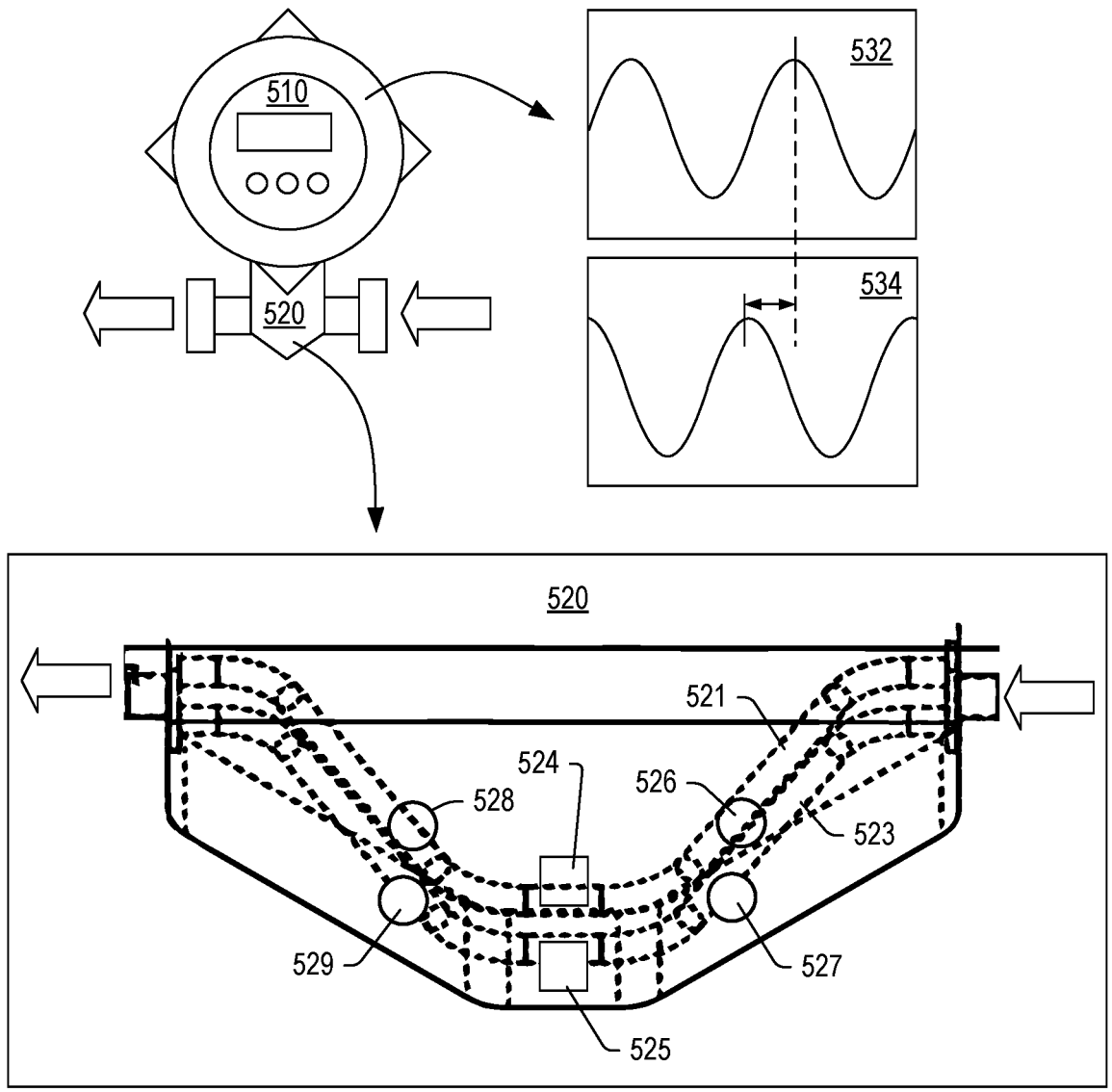
FIG. 5 is a diagram of an example of a flow meter.

FIG. 5 shows an example of a flow meter 500 that includes circuitry 510 and a U sensor tube assembly 520. As shown, the U sensor tube assembly 520 includes a pair of U sensor tubes 521 and 523 along with various driver components 524 and 525 and various sensor components 526, 527, 528 and 529.

As mentioned, a system can include one or more types of flow meters. For example, the system 300 of FIG. 3 shows various flow meters in the environment 310. A flow meter can be a type of meter that can measure fluid flow and that can optionally measure one or more other types of physical characteristics and/or phenomena (e.g., pressure, temperature, density, vibration, orientation, etc.).

As shown in FIG. 5, the flow meter 500 can include one or more sensor tubes (e.g., U sensor tubes, etc.) 521 and 523. For example, consider the flow meter 500 as including the pair of U sensor tubes 521 and 523 that can be provided with a split of incoming flow where the U sensor tubes 521 and 523 oscillate at a natural resonant frequency via the driver components 524 and 525. In such an example, the flow meter 500 can include the sensor components 526, 527, 528 and 529 as magnet and coil assembly pickoffs that can measure voltage amplitudes with respect to time (e.g., sine waves, etc.). When fluid flows in the pair of U sensor tubes 521 and 523, the Coriolis force causes each of the U sensor tubes 521 and 523 to twist in opposition to each other, which results in a phase shift for voltage amplitudes with respect to time (e.g., phase shifted sine waves), which are shown in the plots 532 and 534. In such an example, a time delay between phases can be measured in microseconds where the time delay is proportional to the mass flow rate (e.g., a greater time delay can correspond to a greater mass flow rate). In such an example, frequency can be measured where frequency can provide an indication of density. For example, consider Hooke's law where a tube can be a spring and mass of a tube and fluid therein can be considered a mass coupled to the spring. In such an example, density can be estimated as being proportional to the inverse of the frequency squared. As an example, volumetric flow can be determined from mass flow rate and density (e.g., volumetric flow rate=mass flow rate/density).

A flow meter may be characterized by a flow rate turndown ratio (e.g., up to 100:1 or more, etc.). A flow meter may be rated as to temperature and can include one or more temperature sensors. As an example, a flow meter may be suitable for operation over a range of temperatures from minus 200 degrees C. to plus 350 degrees C. A flow meter may include one or more types of interfaces, busses, etc.

As an example, a flow meter can include circuitry that can measure flow over a range of flow rates. For example, consider a range with a lower limit that can be as low as zero and an upper limit that can be as high as, for example, 400,000 barrels per day (BPD) or more.

As an example, a flow meter can be rated with an uncertainty. For example, consider a flow rate uncertainty on liquids of approximately +/−0.1 percent (e.g., +/−zero stability error). As to density, consider, for example, a density uncertainty of approximately +/−0.0005 g/ml.

As an example, a flow meter can be constructed of various different materials where one or more of the materials can be exposed to fluid and considered to be fluid-wetted. As an example, a flow meter can include one or more fluid-wetted materials such as, for example, one or more of a stainless steel and an alloy (e.g., consider 316/316L SST or Alloy C22).

As an example, a flow meter may be suitable for use in one or more types of hazardous areas where a hazardous area may be characterized according to one or more standards (e.g., CSA, ATEX/IECEx). In North America, hazardous locations can be defined by a combination of classes and divisions or zones, for example, as follows: Class I (a location made hazardous by the presence of flammable gases or vapors that may be present in the air in quantities sufficient to produce an explosive or ignitable mixture); Class II (a location made hazardous by the presence of combustible or electrically conductive dust); Class III (a location made hazardous by the presence of easily ignitable fibers or flyings in the air, but not likely to be in suspension in quantities sufficient to produce ignitable mixtures); Division 1 (a location where a classified hazard exists or is likely to exist under normal conditions); Division 2 (a location where a classified hazard does not normally exist but is possible to appear under abnormal conditions); Zone 0 (an area in which an explosive gas atmosphere is continuously present for a long period of time); Zone 1 (an area in which an explosive atmosphere is likely to occur in normal operation); Zone 2 (an area in which an explosive gas atmosphere does not normally exist); etc.

As an example, a flow meter can include circuitry that can perform I/O counts, for example, consider one or more of dual independent pulse outputs, dual independent analog outputs, status input, and status output.

As an example, a flow meter can include a serial interface such as, for example, a Modbus RS-485 interface.

As an example, a flow meter can be compliant with one or more standards. For example, a flow meter can be compliant with the HART communication protocol (Highway Addressable Remote Transducer), which is a hybrid analog and digital industrial automation open protocol. The HART approach can be utilized with 4 mA to 20 mA analog instrumentation current loops, for example, sharing a pair of wires used by an analog host system.

As an example, a flow meter may include circuitry that can operate using a description language (DL). For example, consider the enhanced Electronic Device Description Language (EDDL) Technology (Emerson, Saint Louis, Missouri). EDDL can provide for various display technologies, for example, consider incorporation of images into displays, and support of graphs and charts for calibration, configuration, etc., of control valves, variable frequency drives, etc. As an example, EDDL can be implemented to provide for various storage schemes such as, for example, persistent data storage that can allow for archiving and retrieval of data from storage (e.g., measurement data, diagnostic data, calibration data, configuration data, etc.).

EDDL can provide for extensions such as those built upon the IEC 61084-2 standard, which may facilitate designing and programming of graphical display systems that can run under a variety of platforms and environments (e.g., from large Human-Machine Interfaces (HMIs) to mobile, hand-held) utilizing various common graphic display capabilities provided by EDDL commands. Through extended EDDL, a common look and feel may be achieved, which can facilitate a more uniform integration, configuration/setup, operation and diagnostics/maintenance (e.g., in an interoperable, multi-vendor environment).

As an example, a flow meter can include one or more wireless technologies, for example, for transmissions and/or receptions. For example, consider one or more infrared sensors that can provide for configuration at a distance. As an example, a flow meter can include circuitry for implementing an EZ-Link interface.

As an example, a flow meter can include circuitry that can perform one or more self-diagnostic methods and output results thereof. For example, consider one or more diagnostic checks for pipeline vibration, media pulsation, etc. As an example, a flow meter can include one or more accelerometers, one or more gyroscopes, one or more gravity meters, etc., which can measure one or more of orientation, vibration, movement, etc.

As an example, a flow meter can include one or more types of end connectors. For example, consider one or more of ASME flanged, DIN flanged, threaded, or tri-clover ferrule.

As an example, a DTM can be implemented using circuitry (e.g., a controller unit, a controller system, etc.) that can be operatively coupled to a flow meter, for example, to at least in part receive data from the flow meter. As explained, a flow meter can include circuitry that can be responsive to input. For example, consider the EDDL as input to control the state of circuitry of a flow meter.

As an example, a DTM may include capabilities to communicate with one or more sensors. For example, the DTM 390 of FIG. 3 may include capabilities to communicate with one or more flow meters such as the flow meter 500 of FIG. 5. In such an example, the DTM may drive data acquisition for input to the DTM. For example, consider the DTM calling for a time delay between phases of harmonic curves (e.g., sine curves) of U sensor tubes where the DTM can utilize the time delay specifically as a time, which may be subject to one or more calculations (e.g., trending, rate of trending, etc.). As an example, a DTM may access and acquire a raw time delay from a dual tube flow meter where the DTM may assess a series of raw time delays for one or more types of behaviors, which can pertain to fluid, fluid flow and/or operation of the flow meter.

As an example, where a DTM includes capabilities for self-checking a sub-system. The DTM may communicate with one or more sensors to determine status of such one or more sensors. For example, consider use of the EDDL to call for diagnostics as to a flow meter. In response, a diagnostic code can be an input to the DTM where the DTM may act to discount data, adjust data, call for servicing of the flow meter, etc. As mentioned, a DTM can be specialized to be specific to a sub-system and one or more types of operational tasks, which can include servicing tasks, associated with the sub-system.

Figure 6:
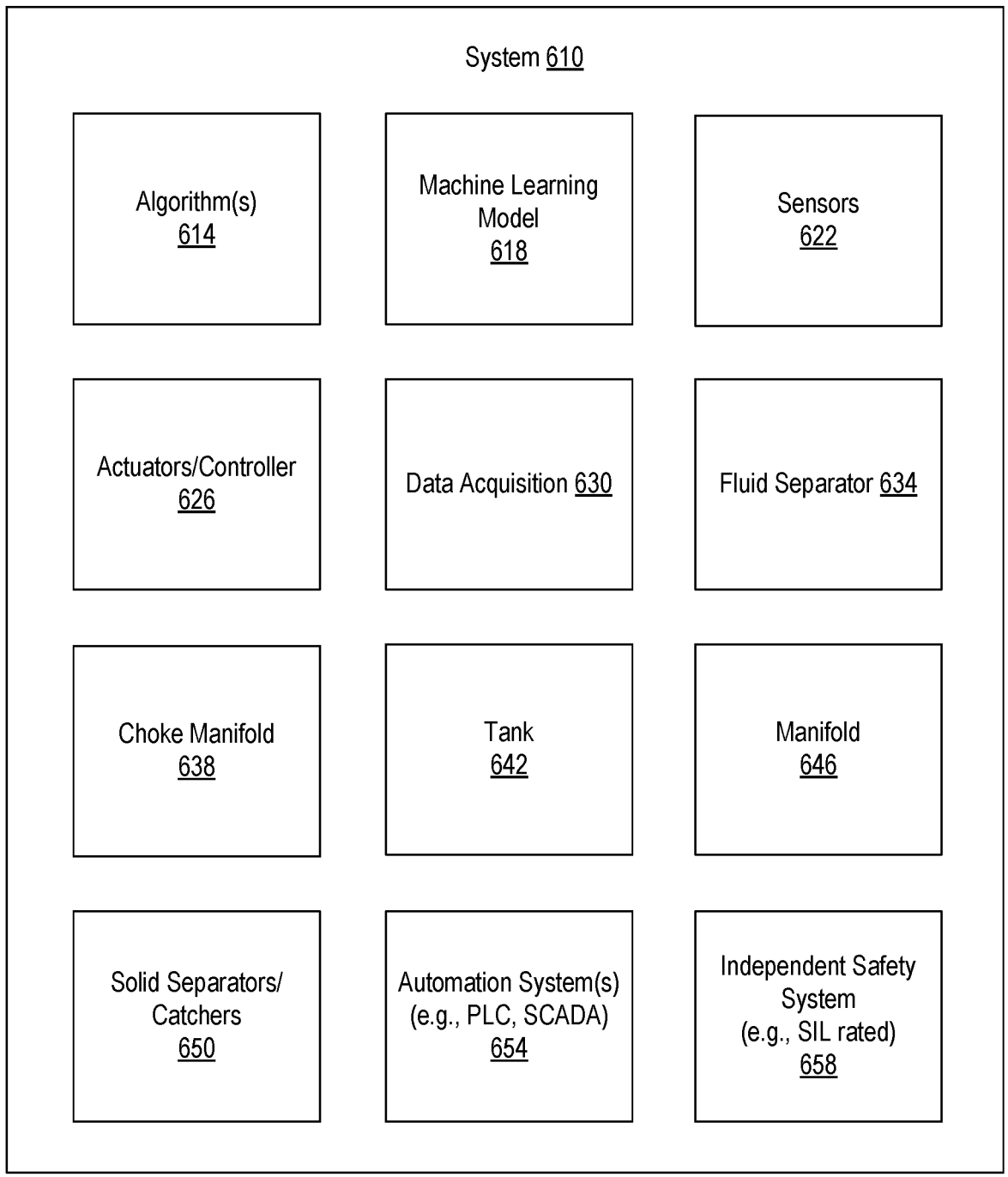
FIG. 6 is a diagram of an example of a system.

FIG. 6 shows an example of a system 610 that can include one or more algorithms 614 (e.g., models such as decision tree models, etc.), one or more machine learning models 618, one or more sensors 622, one or more actuators and/or controllers 626, one or more data acquisition units 630, one or more fluid separators 634, one or more choke manifolds 638, one or more tanks 642, one or more manifolds 646, one or more solid separators and/or catchers 650, one or more automation systems 654 (e.g., controller systems, etc.), and one or more independent safety systems 658 (e.g., SIL rated, etc.).

As an example, the system 110 can include various features of the system 610. As an example, the system 250 can include various features of the system 610. As an example, the system 300 can include various features of the system 610.

In the example of FIG. 6, the system 610 can utilize handcoding and/or machine learning. For example, one or more of the algorithms 614 can include one or more coded decision trees (e.g., decision tree models with hardcoded criteria), etc., which may be developed using knowledge, expertise, etc., of one or more crew members that perform field operations on a system such as the system 110 of FIG. 1, the system 250 of FIG. 2, the system 300 of FIG. 3, etc.

As an example, a bootstrap approach may be implemented where a specification is utilized for purposes of setting up various controller units, controller systems, field sensors, field actuators, etc. In such an example, the specification can be based on knowledge and expertise with a goal of automation. In such an approach, the specification can include a decision tree that can be operable using acquired data to make decisions as to values of one or more parameters that can be implemented in an effort to optimize an operation. As various types of machine learning models demand sufficient training data, adherence to the specification and decision tree across a number of installations can provide for generation of data organized in a manner sufficient to train one or more machine learning models.

As an example, a bootstrap approach can be tiered. For example, consider a first tier as including a specification that is aligned with equipment and operational tasks of one or more operators (e.g., one or more crew members, etc.). Implementation of the first tier can provide for a second tier that includes generating, refining, etc., a decision tree model or other suitable decision making algorithm that can receive input based on acquired data to output parameter values. Implementation of the second tier can provide for a third tier that includes generating one or more trained machine learning models that are aligned with equipment and trained to make decisions, which can include at least some decisions corresponding to operational tasks of one or more operators. In such an example, a hand-off can occur incrementally to transition control from manual control toward autonomous control.

Where some amount of autonomous control is implemented, a system can provide for self-adjusting, which can include calling for additional learning, selecting an updated trained machine learning model, selecting a different machine learning model, etc. As an example, learning can include supervised learning (e.g., using labels, etc.) and/or unsupervised learning (e.g., not using labels, etc.).

As an example, the system 610 can be configured for one or more types of operations such as, for example, one or more of surface testing operations, cleanup operations, bleed-off operations, hydraulic fracturing operations, hydraulic fracturing plug drill out (FPDO) operations, hydraulic fracturing flowback operations, production operations, well intervention operations, production facility operations, etc.

As an example, the system 610 can be or become an autonomous surface system that is configured to self-adjust its parameters to maintain optimal process and operating conditions during performance of one or more operations.

In the example of FIG. 6, the system 610 can include a controller system such as, for example, the controller system 400 of FIG. 4, and can include one or more sensors including flow meters such as, for example, the flow meter 500 of FIG. 5. In such an example, the system 610 can operate at least in part using data acquired by one or more sensors, in particular flow meters, to maintain optimal process and operating conditions during performance of one or more operations that involve flow of fluid.

As explained, the system 610 may be applied to well testing where a digital twin may be utilized. For example, the system 610 can include the DTM 390 of FIG. 3. The system 610 can provide for operational control via a method that includes acquiring data and, based at least in part on at least a portion of the acquired data being fed to a trained machine learning model, generating parameter values for optimum operating conditions as an output. In such an example, the parameter values can be utilized by one or more equipment controllers to adjust set points in an effort to achieve the optimal operating conditions.

As an example, the system 610 can include a diagnostic and insight component can include or be operatively coupled to a trained machine learning model (e.g., a digital twin, etc.) for purposes of outputting useful information and/or warnings. In such an example, the diagnostic and insight component can be capable of acting on its own and self-adjusting.

As an example, a system can include one or more trained machine learning models that can receive input and generate output for autonomous adjustment of a surface system. In such an example, a trained machine learning model can be trained in a manner to at least in part replicate knowledge of and operations performed by a surface crew (e.g., jobs or métier of a surface crew). As an example, such a system can allow for equipment such as a separator to autonomously regulate and re-adjust its set points as a function of actual conditions, including flow conditions. As an example, such a system can be capable of regulating levels and pressures by automation and, for example, may go further by analyzing sensor data and then updating set points as conditions change. Such regulation can be performed at least in part in a manner akin to that of an experienced operational crew. Such an approach can be implemented via training that utilizes operational tasks performed by one or more crew members in response to acquisition of various types of sensor data. As mentioned, a DTM can be hardcoded using knowledge and expertise of such crew members and/or trained using a machine learning model. As mentioned, a tiered approach may be implemented that can transition from a hardcoded model to a trained machine learning model for purposes of enhanced automation.

As an example, the system 610 may be implemented in a manner to allow a separator to operate autonomously and independently from one or more other pieces of equipment. In such an example, the DTM 390 as in FIG. 3 can be specialized to be a digital twin of a separator and one or more operators. In such an approach, implementation of the DTM 390 can increase automation in the environment 310, which can present various hazards to one or more operators. By alleviating demand as to operator presence in a hazardous environment, human risks are reduced (e.g., health, safety and environmental risks). The DTM 390, as mentioned, can be implemented in a manner that is independent from the safety system 320 where, for example, if the DTM 390 cannot adequately handle a condition or conditions, the safety system 320 can take action (e.g., shut down flow, shut down equipment, etc.). As an example, the safety system 320 can be independent though operatively coupled to equipment that implements the DTM 390, for example, to inform that equipment that the safety system 320 has taken one or more actions. Alternatively or additionally, the equipment that implements the DTM 390 can through data acquisition understand or determine that one or more actions have been taken by the safety system 320 (e.g., consider a flow meter outputting a zero flow signal in response to the safety system 320 controlling the flow controller 311 to shut down flow from a wellhead or wellheads, etc.).

As an example, the DTM 390 can include safety features such that it may call for one or more actions to cause a controlled shut down of a wellhead or wellheads. In such an example, the safety system 320 may still be present but not take action where the DTM 390 is implemented in a manner whereby it can take appropriate action as to safety. As an example, the DTM 390 may be implemented in a manner whereby it enables a controlled shut down of a well without exposing personnel to risks and without creating additional risks as may otherwise be triggered by an emergency shut down.

As explained, automation can give rise to risks. As mentioned, a controller system can fail by one or more failure mechanisms. For example, consider a network failure (e.g., at equipment or complete network level), which could have serious consequences on a surface process if it is no longer capable of adapting to the changes in the process.

As an example, a network or system issue at a supervision level (e.g., acquisition or supervision computers crash, network loss, etc.), which would result in equipment being unsupervised and unable to adjust to change of flowrate or pressure, can be mitigated where a safety system is in place such that an emergency shut down can be triggered. In such an example, however, there is a possibility of one or more undesirable behaviors of equipment. For example, a shut down at the flow controller 311 by the safety system 320 in the environment 310 could have undesirable effects on a separator. For example, accumulated pressure in a process may maintain flow rather than immediately stop. In such an example, the pressure and level in the separator could get out of control, which may create spills or fire with uncontrolled flare and burner operations.

As an example, a DTM approach can maintain control over equipment during one or more procedures that may be unrelated to operation of that equipment. For example, a reason for shut down of flow from a wellhead may be unrelated to conditions experienced by a separator. Where a DTM is implemented for such a separator, it may maintain operational control over the separator in a manner that can cause equipment of the separator to operate in a manner that is not detrimental to the separator and/or that reduces risk to other equipment and/or the environment.

As an example, a DTM approach can be implemented to have equipment to handle startup, shutdown, monitoring and continuous operations autonomously, be tolerant to supervision and control loss, react adequately to emergency shutdown and act as an experienced operator would in line with best in class industry standards. Such an approach can be a digital twin with operational knowledge and expertise (e.g., a digital twin with métier).

As explained, a DTM can be derived from insights and knowledge acquired over the years in the industry and then implemented using one or more algorithms (e.g., models), either partially or fully at the equipment level (e.g., separator, choke manifold, etc.). In such an example, equipment can be provided with an ability to foresee changes in a process and react even in the absence of supervision and other control. In the instance that a process change is of a magnitude that would exceed equipment capacities or system capacities, an emergency safety system can be utilized to trigger appropriate action where, for example, equipment may remain with an ability to self-adjust to provide a safe and controlled shut down.

As an example, in the instance of a total failure of supervision, one or more components can be capable of taking on the supervision role, for example, after a defined period of time in order to continue or stop operations. In such an example, a DTM or DTMs can provide for supervision and control of various other types of equipment in a system.

As an example, a machine learning model can be a neural network model, which may be developed based on data from a sensors data database (e.g., operational data), which can include various crew actions (e.g., valves, operation, set point changes, pressure, temperature, flowrate changes, etc.). For example, a machine learning model can be trained and tested on such data. As explained, where a database is continuously increasing in volume of data, a model can be improved (e.g., additionally trained, retrained, etc.), which may provide the model with an ability to learn more complex patterns over time. While various types of machine learning models and/or combinations of machine learning models are mentioned, one or more other types of machine learning models (e.g., or combinations) may be appropriate for system control.

As to handcoded types of algorithms (e.g., models, etc.), a method can include accessing métier data, safety assessments and measures (HAZID, HAZOP, LOPA) and industry standards. As an example, from pFMEA and dFMEA, consequences, monitoring parameters, monitoring methods can be identified for appropriate and safe actions that may be implemented, for example, in the case that a machine learning model is not yet capable to provide a sufficient result.

FIG. 7 shows an example of a system 700 that includes an I/O network layer 711, a control network layer 731, and a supervisory network layer 751. As shown, the I/O network layer 711 can include sub-systems 712-1, 712-2, to 712-N, and a safety sub-system 720 that include various components for acquiring data associated with a physical sub-system and operating the physical sub-system (e.g., control, etc.). The control network layer 731 can include a controller 730, an application server 732 (e.g., operating one or more DTMs and/or one or more other models), network equipment 734 for communications (e.g., transmissions, receptions, etc.), and a safety controller 740 (e.g., operatively coupled to at least the safety sub-system 720 of the I/O network layer 711, etc.). The supervisory network layer 751 can include one or more stations 750 (e.g., local station, edge station or field station) and one or more enterprise stations 754.

As an example, a station can be a workstation that is a computing device or a computing system. As an example, a station may be a mobile device, which may be carried by an individual, a vehicle, etc. As an example, a mobile device may be transportable from site to site, system-to-system, sub-system to sub-system, etc., for one or more purposes, which may include, for example, local data acquisition and/or control. For example, consider issuing an instruction via a graphical user interface rendered to a display of a mobile device that is transmitted and/or processed via the control network layer 731 and issued via the I/O network layer 711. In such an example, a response may be issued by equipment directly and/or indirectly to the mobile device. In a direct manner, consider a local area network (e.g., wireless), a proximity-based communication protocol (e.g., BLUETOOTH, etc.), etc.

As an example, the system 700 may provide for aggregation of interactions, communications, statuses, conditions, etc., for one or more systems. In such an example, the system 700 may be a source of information for training and/or retraining one or more machine learning models (e.g., one or more DTMs, etc.). As explained, a machine learning based approach can improve over time, which may improve as to one or more of prediction accuracy, ability to handle complexity, ability to increase complexity, etc.

In the system 700, the application server 732 can serve one or more DTMs that may be, for example, deployed via the controller 730, optionally in a manner that is sub-system-based. As shown, the safety controller 740 may operate with the safety sub-system 720, for example, via the network equipment 734 and/or via one or more alternative (e.g., redundant, etc.) communication channels.

In the system 700, data may be generated at the level of the I/O network layer 711 at a rate of hundreds of data values per second, which may be routed via network equipment. For a surface system set up for well testing, such data can include separator data, choke manifold data, downstream data, wellhead data, etc. As mentioned, a sensor may operate according to a sampling rate that is of the order of milliseconds (e.g., or microseconds, etc.). As an example, the controller 730 may operate using data samples at a rate of seconds, which may be a rate that intends to include data from a slowest responding sensor, etc., and/or to provide a time increment that can be relevant to phenomena that can occur in a surface system.

As to the one or more operator stations 750, they may be implemented using one or more resources (e.g., local, cloud, etc.). As to the one or more enterprise stations 754, they may be implemented using various resources that can provide for access to at least the control network layer 731. As an example, a supervisory level instruction can call for building of a DTM, deploying a DTM, implementing a DTM, etc. As an example, the application server 732 can provide for installing and/or instantiating a DTM at a wellsite using a supervisory controller system (e.g., SCADA, etc.) and/or a controller unit (e.g., PLC, etc.). As mentioned, a system can deploy multiple DTMs, which may be specialized as to various types of equipment in a surface system.

As mentioned, a DTM (see, e.g., the DTM 390, etc.) can be a model, which may be, for example, an algorithm (e.g., handcoded decision tree, etc.), a trained machine learning model (trained ML model) or a hybrid handcoded/trained ML model that can be deployed to one or more controllers.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

Above, an auto-encoder is mentioned, which may include an encoder that is trained in combination with a decoder. In such an example, unsupervised training may be utilized where the encoder and decoder are trained such that output suitably matches input. As an example, as mentioned, information in a hidden layer may be utilized for one or more purposes. An encoder can generate such information, which may be referred to as information or embeddings in a latent space. In such an example, the information or embedding can be a compressed representation of input, which may characterize the input. For example, a large array or vector of information (e.g., data, etc.) may be compressed using a trained encoder to generate a smaller array or vector, which may be suitable for use in one or more control schemes, comparisons, etc.

An auto-encoder (or autoencoder) may be characterized as a type of artificial neural network that can learn efficient data codings in an unsupervised manner. For example, an auto-encoder can process data to learn a representation (encoding) for the data (e.g., for dimensionality reduction, etc.). Such an approach may involve training the encoder to ignore types of noise (e.g., signal noise, etc.). As explained, a decoder can be trained in combination with an encoder. One or more of various types of auto-encoders may be utilized (e.g., sparse, denoising, contractive, variational, etc.), which may provide for effective learning of representations for classification tasks, generative models, etc. As an example, an auto-encoder may be utilized for recognition (e.g., data-based, image-based, etc.), semantic meaning of symbols, etc.

As an example, a DTM may include one or more features of an auto-encoder. For example, consider an auto-encoder trained utilizing sensor data, control data, etc., which may include associated metadata. In such an example, a DTM may provide for classification of one or more types of conditions, control scenarios, etc., based on input such that control may be effectuated, as desired, in an efficient manner, optionally automatically. In particular, such a DTM may include sensor data as input and output control data (e.g., including one or more set points) that may be implemented on the sub-systems via appropriate control equipment (e.g., one or more controllers, one or more actuators, etc.).

As an example, a machine model, which may be a machine learning model, may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

Figure 8:
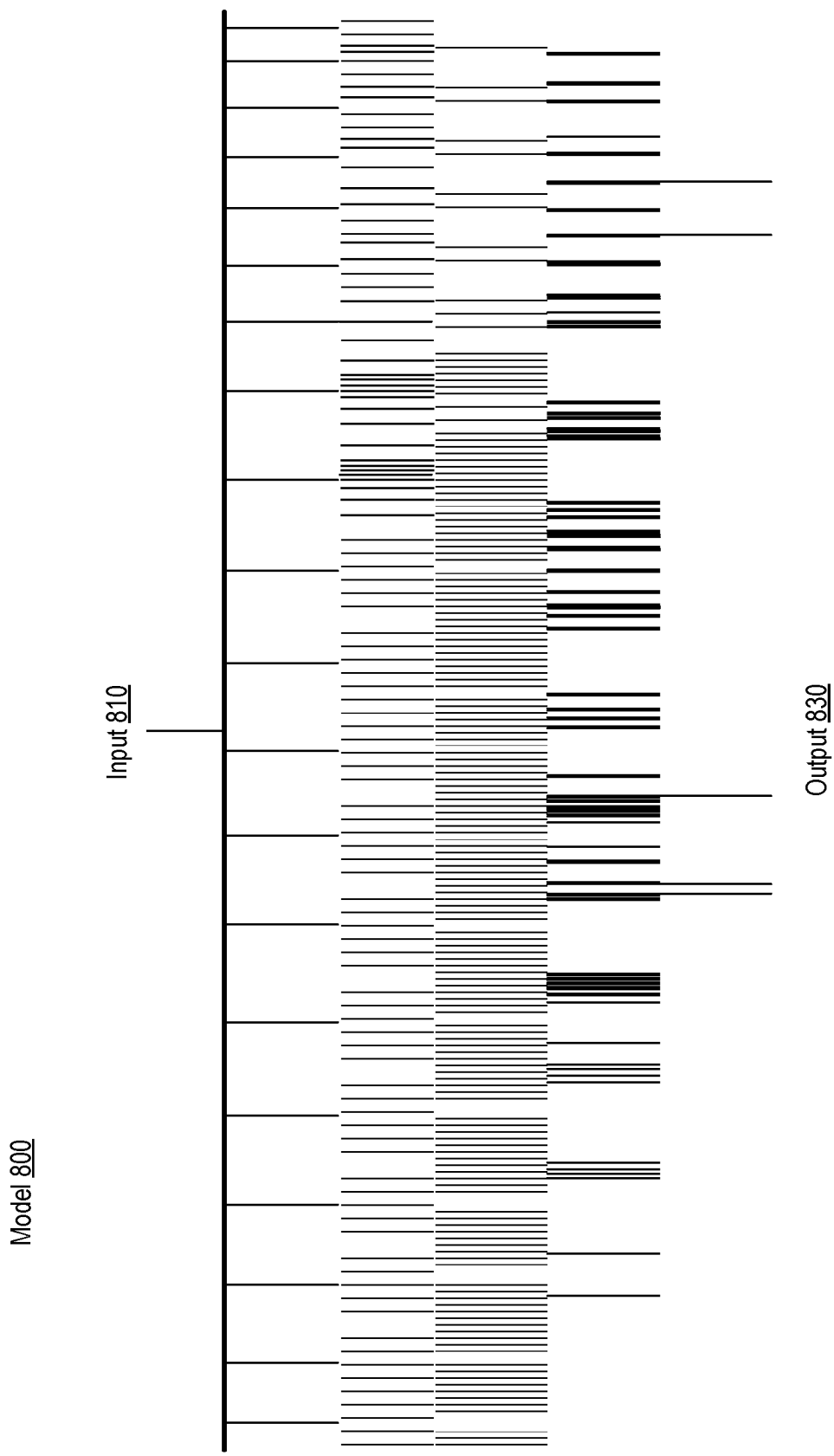
FIG. 8 is a diagram of an example of a model.

FIG. 8 shows an example of a model 800 that is a decision tree model. As shown, the model 800 includes input 810 and output 830. As an example, the model 800 can be a generative model of induction rules as derived from acquired data and operational performance by one or more operators. An optimal decision tree may be defined as a tree that accounts for most of the data, while minimizing the number of levels (e.g., questions). As an example, one or more techniques may be implemented to generate an optimal tree (e.g., ID3/4/5, CLS, ASSISTANT, CART, etc.).

Figure 9:
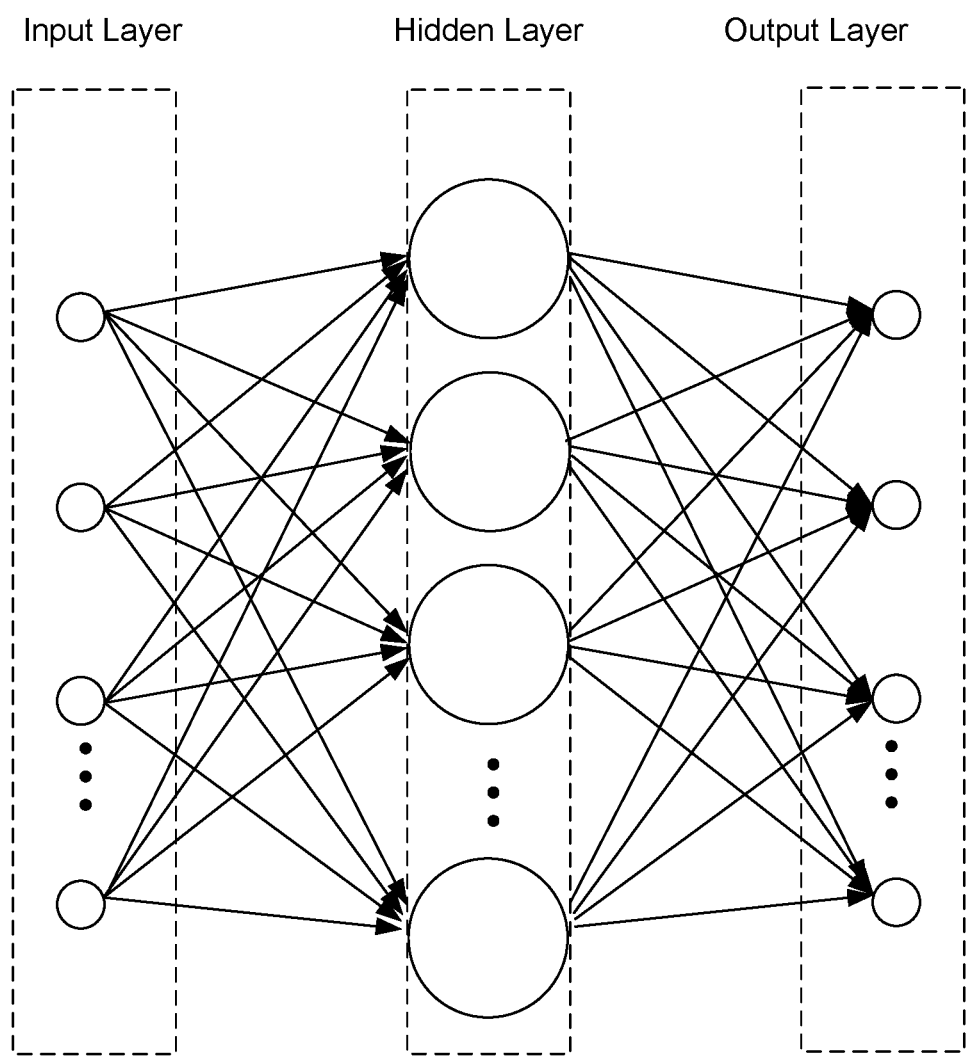
FIG. 9 is a diagram of an example of a machine learning model.

FIG. 9 shows an example of a machine learning model 900 that can be a neural network (NN). As shown, the model 900 can include an input layer, one or more hidden layers and an output layer. As an example, input can be received via the input layer to generate information in the hidden layer and to generate information in the output layer. As an example, information in at least one of a hidden layer and an output layer may be utilized for one or more purposes. As mentioned, an auto-encoder can provide for generating representations (embeddings) in a latent space where "latent" can refer to "hidden".

A NN can include neurons and connections where each connection provides the output of one neuron as an input to another neuron. Each connection can be assigned a weight that represents its relative importance. A given neuron can have multiple input and output connections. A NN can include a propagation function that computes the input to a neuron from outputs of its predecessor neurons and their connections as a weighted sum. As an example, a bias term can be added to the result of the propagation.

As an example, neurons can be organized into multiple layers, particularly in deep learning NNs. As explained, the layer that receives external data can be an input layer and the layer that produces a result or results can be an output layer. As an example, a NN may be fully connected where each neuron in one layer connects to each neuron in the next layer. As an example, a NN can utilize pooling, where a group of neurons in one layer connect to a single neuron in the next layer, thereby reducing the number of neurons in that layer. As an example, a NN can include connections that form a directed acyclic graph (DAG), which may define a feedforward networks. Alternatively, a NN can allow for connections between neurons in the same or previous layers (e.g., a recurrent network).

As an example, a NN may be a recurrent neural network (RNN), which is a class of artificial neural networks (ANNs) where connections between nodes can form a directed graph (DG) along a temporal sequence. A RNN can exhibit temporal dynamic behavior. In comparison to feedforward neural networks, a RNN can use its internal state (memory) to process variable length sequences of inputs.

As explained, one or more neural network models can be developed based on data (e.g., datasets, etc.) of one or more databases, live streams, etc., for sensors data (e.g., operational data) and associated types of crew actions (e.g., actions as to one or more of valves, operations, setpoint changes, pressures, temperatures, flowrate changes, etc.) where, for example, individuals performing such crew actions can include individuals that have been trained and tested (e.g., for system and/or one or more sub-system operations). In such an example, data can continuously grow where one or more of such models can be improved (e.g., trained, re-trained, etc.) such that, for example, more complex patterns can be learned over time. In such an example, more complex patterns may include patterns as to physical phenomena that may involve interactions between one or more sub-systems (e.g., complex interdependencies, etc.), for example, as to how such one or more sub-systems may be controlled.

As an example, a RNN may be characterized as a finite impulse model or as an infinite impulse model, either of which may exhibit temporal dynamic behavior. A finite impulse recurrent network can be a directed acyclic graph (DAG) that can be unrolled and replaced with a strictly feedforward neural network, while an infinite impulse recurrent network can be a directed cyclic graph (DAG) that cannot be unrolled.

A RNN, whether as a finite impulse or an infinite impulse recurrent network, can include additional stored states where storage can be under direct control by the RNN. As an example, storage can also be replaced by another network or graph (e.g., consider time delays, feedback loops, etc.). Such controlled states can be referred to as gated state or gated memory, and can be part of a long short-term memory (LSTM) approach, a gated recurrent units (GRUs) approach, etc. (e.g., consider a feedback neural network).

LSTM can be part of a deep learning system that can, for example, aim to address the vanishing gradient problem. LSTM may be augmented by recurrent gates (e.g., forget gates). LSTM can reduce risks of backpropagated errors from vanishing or exploding. For example, errors can flow backwards through a number of virtual layers unfolded in space. LSTM can learn tasks that demand memory of one or more events that happened a number of discrete time steps earlier. A LSTM approach can be employed with various types of timings, even given long delays between particular events. A LSTM approach may be employed where signals can include a range of frequencies (e.g., mixture of low and high frequency components, etc.).

As an example, a machine model may utilize stacks of LSTM RNNs, which may be, for example, trained via Connectionist Temporal Classification (CTC) to find an RNN weight matrix that maximizes the probability of the label sequences in a training set, given the corresponding input sequences. CTC may achieve both alignment and recognition.

As mentioned, a machine model can include one or more gated recurrent units (GRUs). A GRU can be a gating mechanism in a RNN. As an example, a GRU can be utilized in addition to or alternative to a LSTM; noting that a GRU approach may have fewer parameters than a LSTM approach, as a GRU can be without an output gate.

As an example, a machine learning model can be trained for handling data that can be synchronous and/or data that can be asynchronous. For example, a sub-system may operate in a manner that can generate data (e.g., sensor data, etc.) that are available according to a synchronous data transmission technique where, for example, the data are accompanied by timing signals (e.g., generated by an electronic clock) to ensure that the transmitter and the receiver are in step (synchronized) with one another. In such an example, data may be transmitted in blocks (e.g., frames or packets) spaced by fixed time intervals.

As to asynchronous data, it may be transmitted in spurts where a transmission technique can include inserting a start bit before each data character and a stop bit at its termination to inform a receiver where the data "spurt" begins and ends.

While the foregoing examples describe various aspects of transmission, synchronous may refer to streaming data that are continually streamed and asynchronous may refer to data that are not continually streamed. For example, where an alarm condition is reached, that alarm condition may cause transmission of data, which may differ from continually streamed data. As another example, an alarm condition may trigger streaming of data that had not previously been streaming. In such an approach, an alarm condition may commence a synchronous data stream. As mentioned, in synchronous transmission, a time interval of transmission can be constant; whereas, in asynchronous transmission, a time interval of transmission can be other than constant (e.g., different intervals, random intervals, etc.). In a synchronous transmission mode, data may be streamed without a "gap" between data; whereas, in an asynchronous transmission mode, data can be separated by a "gap", which, as mentioned, can be irregular.

As an example, a system and/or a sub-system may generate data that can be available regularly or irregularly. As an example, a machine learning model can include an architecture that can handle regular and/or irregular data. As an example, consider a machine learning model that can receive inputs and can generate one or more outputs where an output may be a prediction based at least in part on received inputs.

As an example, a machine learning model may be or include a multivariate multiple time series regression model. For example, in multiple regression, a response variable Y can be related to a number of predictor variables, which may be designed by a number k. For example, consider the following equation where t is time:

$$Y = b_0 + b_1 X_{1,t} + \ldots + b_k X_{k,t} + \text{noise}$$

In a multivariate multiple time series regression, there can be m response time series variables related to the k predictor time series variables.

As an example, a machine learning model may include one or more features of a significance-offset convolutional neural network (SOCNN) that has a deep convolutional network architecture for multivariate time series regression.

For example, consider a model rooted in an autoregressive (AR) model that includes gating mechanisms used in recurrent neural networks (RNNs). In such an example, an AR-like weighting system can be implemented where a final predictor is obtained as a weighted sum of sub-predictors, while weights are data-dependent functions learned through a convolutional network. As an example, such an architecture may be suitable for scenarios that can include asynchronous time series. As an example, a machine learning model may operate to predict ahead in a manner conditional to a number of past observations.

As an example, a machine learning model may include training using data from multiple sources. For example, individual operators may be individual sources of information, which may provide such information at irregular moments in time. In such an example, operator A may provide information (e.g., analysis, control commands, etc.) less frequently than operator B even though underlying dynamics of a process may include commonalities. In such an example, one operator may experience fewer issues than another, where an issue may be due to a mis-prediction, a late prediction, etc. As an example, data from multiple sources may pertain to how an operator responds to a shut down. For example, consider an ESD system that causes a shut down of flow from a well where the operator takes one or more actions to address risk of one or more detrimental events at a sub-system (e.g., a separator, etc.). In such an example, a response variable may be a sub-system related control variable. As an example, a trained machine learning model may receive input and output a response variable that is a sub-system related control variable where such a trained machine learning model may output the response variable as a prediction (e.g., in advance of a demand for implementing appropriate control). Such an approach may involve a digital twin that is a "twin" of one or more things (e.g., equipment, a human operator, etc.).

As mentioned, an operator may be responsible for one or more pieces of equipment, sub-systems, systems, etc. As mentioned, a separator can be a sub-system where data are available for how different operators operate such a sub-system responsive to generated data, which may include synchronous data and/or asynchronous data. As an example, data may be at a particular frequency, random, etc. As an example, data may be generated, transmitted, received, available, etc., on one or more time scales, one or more frequencies, one or more resolutions, one or more signal-to-noise ratios, etc.

In an article by Binkowski et al., entitled Autoregressive Convolutional Neural Networks for Asynchronous Time Series, ICML 2017 Time Series Workshop, Sydney, Australia, 2017, which is incorporated by reference herein, different sources of financial data were considered where the value of an asset is observed differently by each of the different sources, which may observe irregularly in time, different biases, different noise, etc. Though, the sources can be somewhat correlated and may include lead-lag relationships. And, it is possible that the sources can perform adequately such that their behavior is worth making an effort to "capture" through coupling of linear models with deep neural networks that can learn nonlinear relationships.

As mentioned, a machine learning model may be trained using training data from or derived from human operators, where such data may optionally include data from or derived from machine operators (e.g., automated controller, etc.). As an example, a method can include building a first model, operating equipment according to the first model, acquiring data and utilizing the data to train a second model. In such an example, a progression may exist from human control toward machine control. As to the first model, it may be built using data from various sources, which can include various operators. As operations progress, one or more other models (e.g., or the same model) may be trained using data from those progressed operations. In such an approach, human operator data may help to bootstrap development of an automated controller that is based at least in part on a machine learning model.

As to a machine learning model (ML model), as explained, such a model can be a neural network model (NN model). As an example, a trained ML model can be utilized to control one or more sub-systems. Various types of data may be acquired and optionally stored, which may provide for training one or more ML models and/or for offline analysis, etc. For example, air control parameters output by a trained NN model can be stored in digital storage for later analysis, which may include further training, training a different ML model, etc.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

Figure 10:
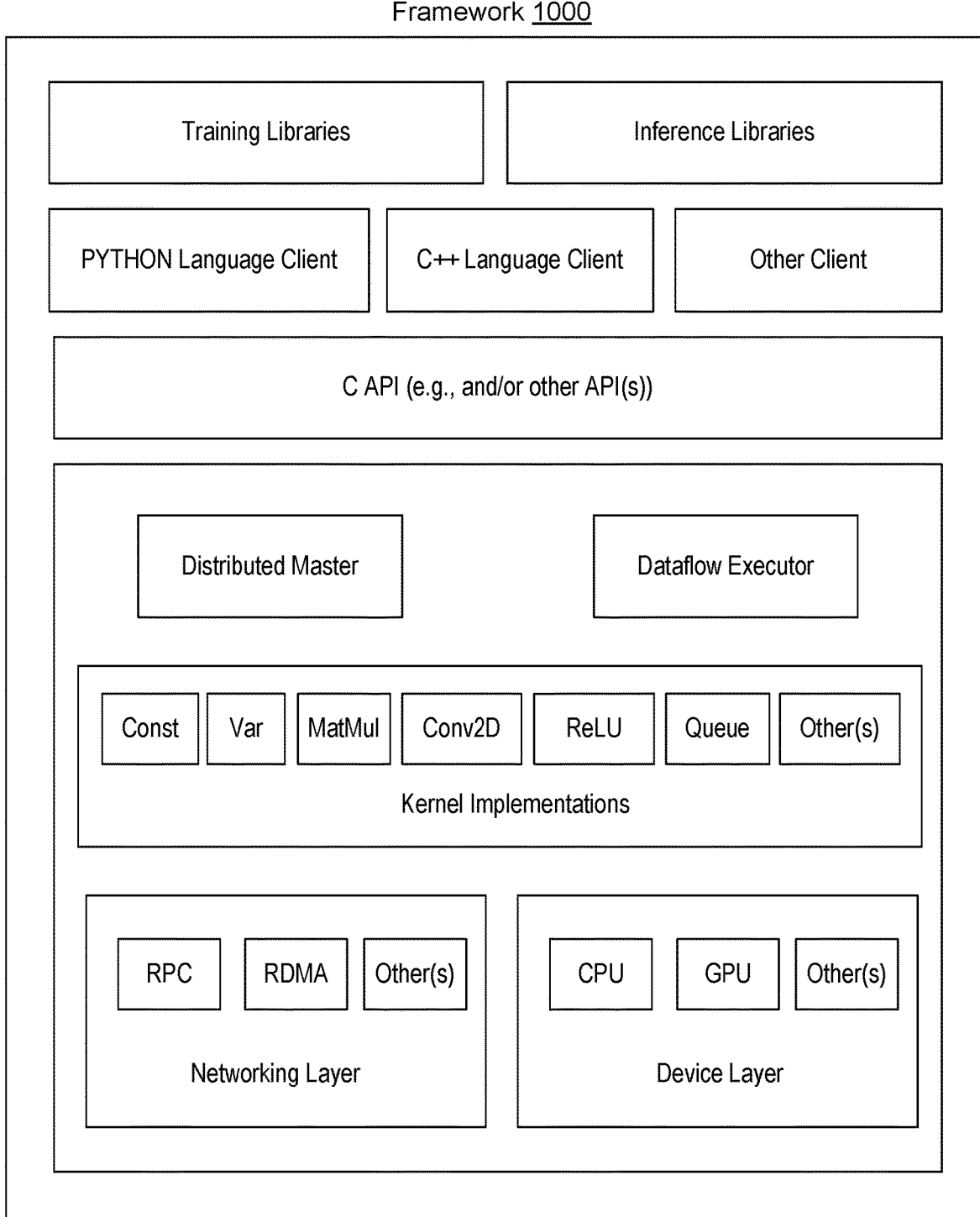
FIG. 10 is a diagram of an example of a computational framework.

FIG. 10 shows an architecture 1000 of a framework such as the TENSORFLOW framework. As shown, the architecture 1000 includes various features. As an example, in the terminology of the architecture 1000, a client can define a computation as a dataflow graph and, for example, can initiate graph execution using a session. As an example, a distributed master can prune a specific subgraph from the graph, as defined by the arguments to "Session.run( )"; partition the subgraph into multiple pieces that run in different processes and devices; distributes the graph pieces to worker services; and initiate graph piece execution by worker services. As to worker services (e.g., one per task), as an example, they may schedule the execution of graph operations using kernel implementations appropriate to hardware available (CPUs, GPUs, etc.) and, for example, send and receive operation results to and from other worker services. As to kernel implementations, these may, for example, perform computations for individual graph operations.

Figure 11:
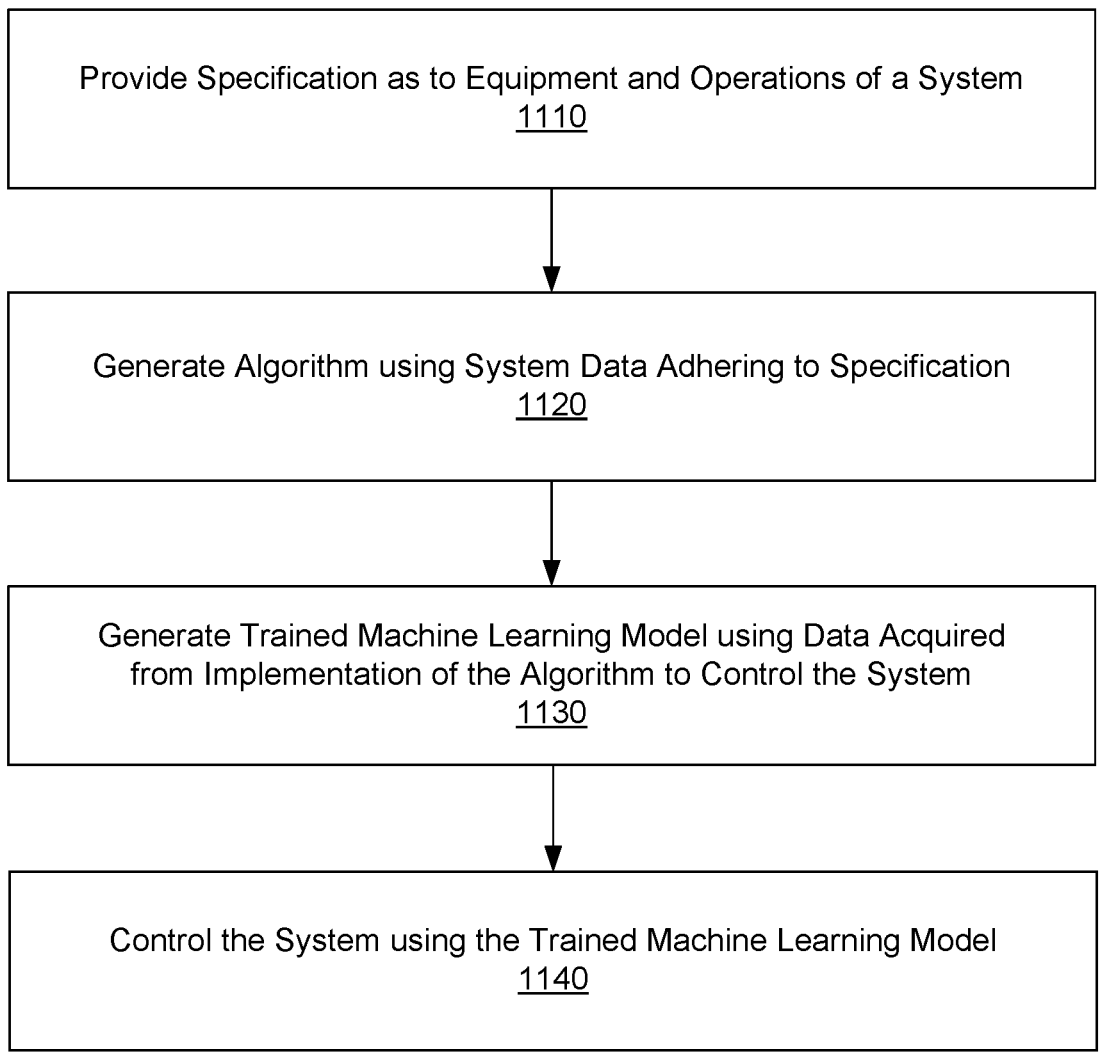
FIG. 11 is a diagram of an example of a method.

FIG. 11 shows an example of a workflow 1100 that includes a provision block 1110 for providing a specification as to equipment and operations of a system, a generation block 1120 for generating an model using system data adhering to the specification (e.g., a decision tree model, etc.), a generation block 1130 for generating a trained machine learning model using data acquired from implementation of the model to control the system; and a control block 1140 for controlling the system using the trained machine learning model.

In the example of FIG. 11, the specification can include sub-system information as to particular sub-systems of the system whereby the sub-systems are amenable to control via parameters where a skilled operator would, in a manual operational mode, set various parameter values in an effort to optimize operation of the sub-system. As an example, in FIG. 11, the model (e.g., an algorithm, etc.) may be a decision tree model. As an example, where data are sufficient for generation of a machine learning model, the workflow 1100 may proceed to the block 1130, optionally without performing the block 1120 (e.g., without first controlling the system according to the algorithm, etc.). As an example, the machine learning model may be a feedforward neural network that receives data as input and that outputs one or more parameter values in a probabilistic manner. In such an example, the one or more parameter values can be communicated to one or more components of a system for purposes of controlling at least a portion of the system.

FIG. 12 shows an example of a method 1200 and an example of a system 1290. As shown, the method 1200 includes an acquisition block 1210 for acquiring data during operation of a surface system that handles fluid using sub-systems; a generation block 1220 for generating a parameter value for one of the sub-systems using at least a portion of the acquired data and a model that models the sub-system using historical data that include operational adjustment data for operational adjustments responsive to conditions; and a control block 1230 for automatically controlling the one of the sub-systems using the parameter value. In such an example, the model may be a machine learning model that has been trained using historical data (e.g., including historical acquired sensor data and historical operational adjustment data) and that enables output of the parameter value based on input of acquired data.

The method 1200 is shown as including various computer-readable storage medium (CRM) blocks 1211, 1221, and 1231 that can include processor-executable instructions that can instruct a computing system, which can be a control system, to perform one or more of the actions described with respect to the method 1200.

In the example of FIG. 12, the system 1290 includes one or more information storage devices 1291, one or more computers 1292, one or more networks 1295 and instructions 1296. As to the one or more computers 1292, each computer may include one or more processors (e.g., or processing cores) 1293 and memory 1294 for storing the instructions 1296, for example, executable by at least one of the one or more processors 1293 (see, e.g., the blocks 1211, 1221, and 1231). As an example, a computer may include one or more network interfaces (e.g., wired or wireless), one or more graphics cards, a display interface (e.g., wired or wireless), etc.

As an example, the method 1200 may be a workflow that can be implemented using one or more frameworks that may be within a framework environment. As an example, the system 1290 can include local and/or remote resources. For example, consider a browser application executing on a client device as being a local resource with respect to a user of the browser application and a cloud-based computing device as being a remote resources with respect to the user. In such an example, the user may interact with the client device via the browser application where information is transmitted to the cloud-based computing device (or devices) and where information may be received in response and rendered to a display operatively coupled to the client device (e.g., via services, APIs, etc.).

As an example, a method can include acquiring data during operation of a surface system that handles fluid using sub-systems; generating a parameter value for one of the sub-systems using at least a portion of the data and a model that models the sub-system using historical data that include operational adjustment data for operational adjustments responsive to conditions; and automatically controlling the one of the sub-systems using the parameter value.

As an example, a model can be or include a decision tree model. As an example, a model can be or include a machine learning model. As an example, a model can be or include a neural network model. As an example, a model can be or include a digital twin with métier model. As an example, a model may be a hybrid model that includes a coded model and/or portion and a trained model and/or portion.

As an example, a method can include training a model using historical data and associated historical parameter values to learn weights as data-dependent functions, where a generated parameter value is based at least in part on output of the trained model, where the output depends on the learned weights being applied to variables of the trained model (e.g., consider a regression type of model, etc.).

As an example, operational adjustment data can include data from manual adjustments to a modeled sub-system. For example, consider decisions made by one or more operators responsive to various types of input (e.g., sensor data, standard operating procedures, etc.).

As an example, a method can include automatically controlling a sub-system by utilizing a controller disposed in an area classified as a hazardous area.

As an example, a model can be utilized to generate a parameter value responsive to acquired data being indicative of a shut down of flow of fluid to a system. For example, consider automatically controlling a sub-system using the parameter value to operate the sub-system to reduce risk of damage to the sub-system.

As an example, a sub-system can be a sub-system of a well testing system, for handling fluid extracted from at least a wellbore, where the sub-system can include one or more of a manifold, a choke manifold, a burner and a separator.

As an example, a sub-system can include a separator for separating fluid extracted from at least a wellbore during a well test where, for example, the separator includes at least one flow meter. In such an example, a parameter value can correspond to a state of a flow valve of the sub-system.

As an example, acquired data can be indicative of one or more of a pressure, a temperature and a flow in a sub-system or, for example, multiple sub-systems where some interdependency exists.

As an example, acquired data can be indicative of a pressure being greater than a desired pressure. In such an example, a safety assessment may be performed, for example, depending on how much greater the pressure may be than a desired pressure. As mentioned, one or more types of control schemes can include set point control. As an example, a control action may be for a change in a set point and/or for a change that aims to help maintain a set point; noting that various other types of control actions may be performed using one or more outputs of a model or models.

As an example, a parameter value can correspond to a set point value for fluid flow in the sub-system. As an example, a parameter value can correspond to a set point value for pressure in the sub-system.

As an example, a method can consider conditions, which may include one or more of optimal operational conditions, emergency operational conditions and diagnostic conditions for diagnostics of at least one flow meter.

As an example, acquired data can be indicative of a pressure being greater than a desired pressure. As an example, a parameter value can correspond to a set point value for fluid flow in a sub-system. As an example, a parameter value can correspond to a set point value for pressure in a sub-system.

As an example, a method can include using at least a portion of acquired data and a model that models a sub-system using historical data, which include operational adjustment data for operational adjustments responsive to conditions, where the conditions can include optimal operational conditions, emergency operational conditions, and/or diagnostic conditions for diagnostics of at least one piece of equipment of a sub-system (e.g., consider a flow meter, etc.).

As an example, a method can include acquiring data during operation of a surface system that handles fluid using sub-systems; generating a parameter value for one of the sub-systems using at least a portion of the data and a model that models the sub-system using historical data that include operational adjustment data for operational adjustments responsive to conditions; automatically controlling the one of the sub-systems using the parameter value; acquiring additional data during operation of the surface system and updating the model using at least a portion of the additional data, where updating includes at least one of relearning at least one existing weight and learning at least one new weight, where the at least one new weight increases complexity of the model. For example, a method can include continuous learning, which may be in part via feedback as to machine action and/or in part via feedback as to human action. For example, consider a method that can be implemented with some amount of human oversight, which may be lessened over time as a model or models learn at least how human action may be performed. As explained, a model or models may learn complexity that may be beyond that expected of a human according to training of the human. For example, a model or models may learn complexities as to interdependencies between sub-systems, which may improve overall control (e.g., as to predictability and/or efficiency) of a system such as, for example, the system 110 of FIG. 1, the system 250 of FIG. 2, the system 300 of FIG. 3, etc.

As an example, a system can include a processor; memory accessible to the processor; processor-executable instructions stored in the memory and executable by the processor to instruct the system to: acquire data during operation of a surface system that handles fluid using sub-systems; generate a parameter value for one of the sub-systems using at least a portion of the data and a model that models the sub-system using historical data that include operational adjustment data for operational adjustments responsive to conditions; and automatically control the sub-system using the parameter value.

As an example, one or more computer-readable storage media can include computer-executable instructions executable to instruct a computing system to: acquire data during operation of a surface system that handles fluid using sub-systems; generate a parameter value for one of the sub-systems using at least a portion of the data and a model that models the sub-system using historical data that include operational adjustment data for operational adjustments responsive to conditions; and automatically control the sub-system using the parameter value.

As an example, a computer program product can include computer-executable instructions to instruct a computing system to perform one or more methods such as, for example, the method 1100 of FIG. 11, the method 1200 of FIG. 12, etc.

As an example, a method may be implemented in part using computer-readable media (CRM), for example, as a module, a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

According to an embodiment, one or more computer-readable media may include computer-executable instructions to instruct a computing system to output information for controlling a process. For example, such instructions may provide for output to a sensing process, an injection process, a drilling process, an extraction process, an extrusion process, a pumping process, a heating process, a burning process, an analysis process, etc.

Figure 13:
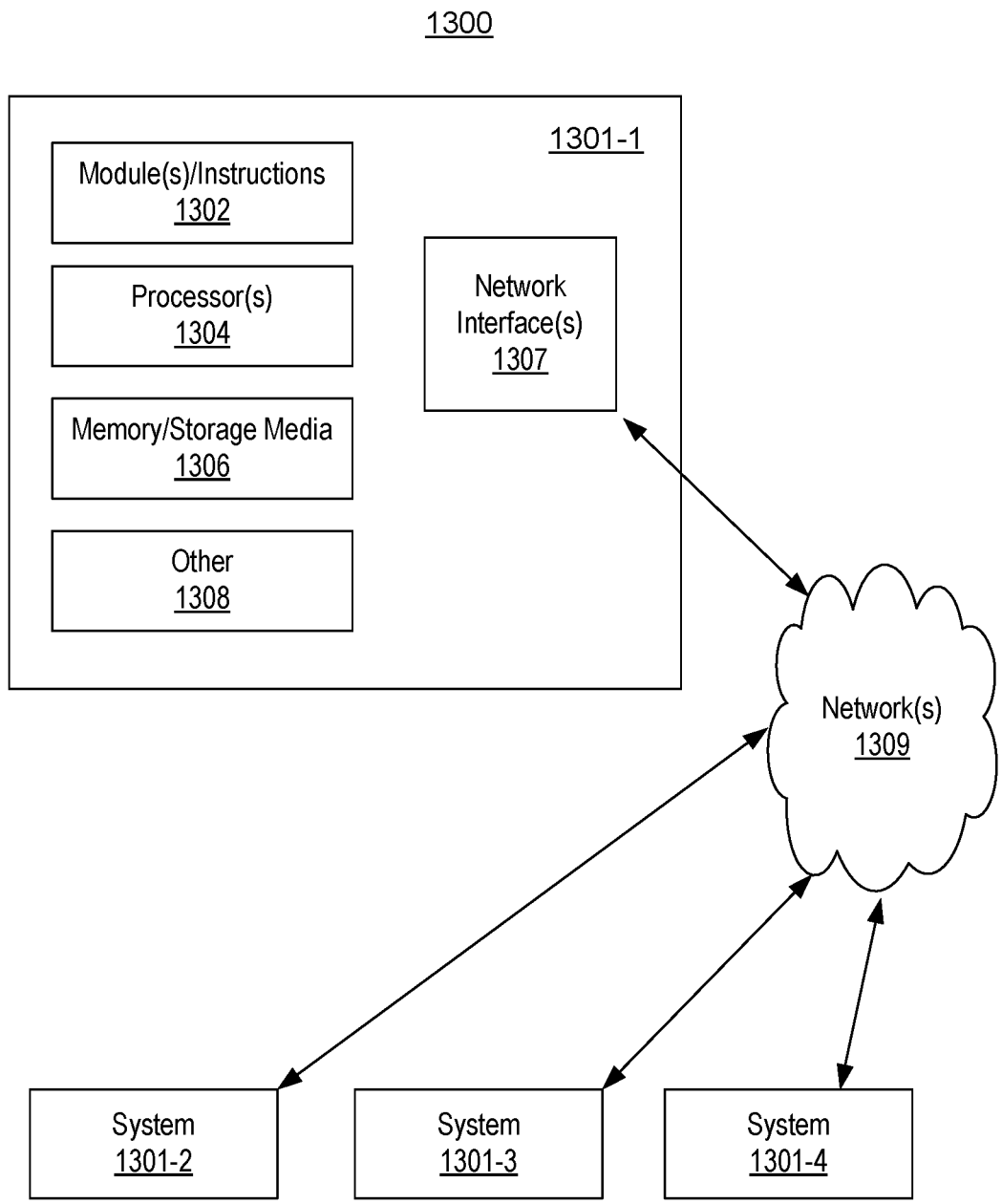
FIG. 13 is a diagram of an example of a computing system.

In some embodiments, a method or methods may be executed by a computing system. FIG. 13 shows an example of a system 1300 that can include one or more computing systems 1301-1, 1301-2, 1301-3 and 1301-4, which may be operatively coupled via one or more networks 1309, which may include wired and/or wireless networks.

As an example, a system can include an individual computer system or an arrangement of distributed computer systems. In the example of FIG. 13, the computer system 1301-1 can include one or more modules 1302, which may be or include processor-executable instructions, for example, executable to perform various tasks (e.g., receiving information, requesting information, processing information, simulation, outputting information, etc.).

As an example, a module may be executed independently, or in coordination with, one or more processors 1304, which is (or are) operatively coupled to one or more storage media 1306 (e.g., via wire, wirelessly, etc.). As an example, one or more of the one or more processors 1304 can be operatively coupled to at least one of one or more network interface 1307. In such an example, the computer system 1301-1 can transmit and/or receive information, for example, via the one or more networks 1309 (e.g., consider one or more of the Internet, a private network, a cellular network, a satellite network, etc.).

As an example, the computer system 1301-1 may receive from and/or transmit information to one or more other devices 1308, which may be or include, for example, one or more of the computer systems 1301-2, etc. A device may be located in a physical location that differs from that of the computer system 1301-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1306 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

FIG. 14 shows components of a computing system 1400 and a networked system 1410 that includes a network 1420. The system 1400 includes one or more processors 1402, memory and/or storage components 1404, one or more input and/or output devices 1406 and a bus 1408. According to an embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). According to an embodiment, a computer-readable medium may be a storage component such as a physical memory storage device, for example, a chip, a chip on a package, a memory card, etc.

According to an embodiment, components may be distributed, such as in the network system 1410. The network system 1410 includes components 1422-1, 1422-2, 1422-3, . . . 1422-N. For example, the components 1422-1 may include the processor(s) 1402 while the component(s) 1422-3 may include memory accessible by the processor(s) 1402. Further, the component(s) 1422-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for controlling surface systems for hydrocarbon reservoirs, comprising:
acquiring data during operation of a surface system that handles fluid using sub-systems;
generating a parameter value for one of the sub-systems using at least a portion of the acquired data and a model that models the sub-system using historical data that comprise operational adjustment data for operational adjustments responsive to conditions, wherein the model generates the parameter value responsive to the acquired data being indicative of a shut-down of flow of the fluid to the sub-system, wherein the model comprises a decision tree model trained via a tiered approach having a first tier, a second tier, and a third tier, wherein the first tier comprises training the decision tree model based on a specification, the second tier comprises training the decision tree model based on the acquired data, and the third tier comprises training the decision tree model to autonomously execute the shut-down of the fluid to the sub-system; and
automatically controlling the one of the sub-systems using the parameter value.

2. The method of claim 1, comprising training the model using the historical data and associated historical parameter values to learn weights as data-dependent functions, wherein the generated parameter value is based at least in part on output of the trained model, wherein the output depends on the learned weights being applied to variables of the trained model.

3. The method of claim 1, wherein the operational adjustment data comprise data from manual adjustments to a modeled sub-system.

4. The method of claim 1, wherein the sub-system is disposed in an area classified as a hazardous area, wherein automatically controlling the sub-system utilizes a controller disposed in the hazardous area.

5. The method of claim 1, wherein the sub-system is a sub-system of a well testing system, for handling fluid extracted from at least a wellbore, wherein the sub-system comprises one or more of a manifold, a choke manifold, a burner, and a separator.

6. The method of claim 1, wherein the sub-system comprises a separator for separating fluid extracted from at least a wellbore during a well test.

7. The method of claim 6, wherein the separator comprises at least one flow meter.

8. The method of claim 7, wherein the parameter value corresponds to at least one of a state of a flow valve of the sub-system, a set point value for fluid flow in the sub-system, or another set point value for pressure in the sub-system.

9. The method of claim 1, wherein the acquired data are indicative of one or more of a pressure, a temperature, and a flow in the sub-system.

10. The method of claim 1, wherein the acquired data are indicative of a pressure being greater than a desired pressure.

11. The method of claim 1, wherein the conditions comprise one or more of optimal operational conditions, emergency operational conditions, and diagnostic conditions for diagnostics of at least one flow meter.

12. The method of claim 1, comprising acquiring additional data during operation of the surface system and updating the model using at least a portion of the additional data, wherein the updating comprises at least one of relearning at least one existing weight and learning at least one new weight, wherein the at least one new weight increases complexity of the model.

13. The method of claim 1, wherein the fluid comprises a hydrocarbon-containing well fluid, and the shut-down comprises a controlled shut-down of flow of the hydrocarbon-containing well fluid to the sub-system performed with flow control equipment.

14. A system comprising:
a processor;
memory accessible to the processor; and
processor-executable instructions stored in the memory and executable by the processor to instruct the system to:
acquire data during operation of a surface system that handles fluid using sub-systems;
generate a parameter value for one of the sub-systems using at least a portion of the acquired data and a model that models the sub-system using historical data that comprise operational adjustment data for operational adjustments responsive to conditions wherein the model generates the parameter value responsive to the acquired data being indicative of a shut-down of flow of the fluid to the sub-system, wherein the model comprises a decision tree model trained via a tiered approach having a first tier, a second tier, and a third tier, wherein the first tier comprises training the decision tree model based on a specification, the second tier comprises training the decision tree model based on the acquired data, and the third tier comprises training the decision tree model to autonomously execute the shut-down of the fluid to the sub-system; and
automatically control the sub-system using the parameter value.

15. The system of claim 14, wherein the fluid comprises a hydrocarbon-containing well fluid, and the shut-down comprises a controlled shut-down of flow of the hydrocarbon-containing well fluid to the sub-system performed with flow control equipment.

16. One or more non-transitory computer-readable storage media comprising computer-executable instructions executable to instruct a computing system to:
acquire data during operation of a surface system that handles fluid using sub-systems;
generate a parameter value for one of the sub-systems using at least a portion of the acquired data and a model that models the sub-system using historical data that comprise operational adjustment data for operational adjustments responsive to conditions, wherein the model generates the parameter value responsive to the acquired data being indicative of a shut-down of flow of the fluid to the sub-system, wherein the model comprises a decision tree model trained via a tiered approach having a first tier, a second tier, and a third tier, wherein the first tier comprises training the decision tree model based on a specification, the second tier comprises training the decision tree model based on the acquired data, and the third tier comprises training the decision tree model to autonomously execute the shut-down of the fluid to the sub-system; and
automatically control the sub-system using the parameter value.

17. The media of claim 16, wherein the fluid comprises a hydrocarbon-containing well fluid, and the shut-down comprises a controlled shut-down of flow of the hydrocarbon-containing well fluid to the sub-system performed with flow control equipment.

* * * * *